United States Patent
Phillips et al.

(10) Patent No.: US 7,363,273 B2
(45) Date of Patent: Apr. 22, 2008

(54) DEBIT PURCHASING OF STORED VALUE CARD FOR USE BY AND/OR DELIVERY TO OTHERS

(75) Inventors: Gregory Joseph Phillips, Landenberg, PA (US); Rebecca Deporte, Landenberg, PA (US); Jeffrey Norwine, Wilmington, DE (US); Penny Joines, Media, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 10/987,086

(22) Filed: Nov. 15, 2004

(65) Prior Publication Data
US 2005/0097043 A1  May 5, 2005

Related U.S. Application Data

(63) Continuation of application No. 10/441,067, filed on May 20, 2003, now Pat. No. 6,892,187, which is a continuation of application No. 09/102,044, filed on Jun. 22, 1998, now Pat. No. 6,615,189.

(51) Int. Cl.
*G06Q 40/00* (2006.01)

(52) U.S. Cl. .......................................... 705/41; 705/14
(58) Field of Classification Search ................... 705/1, 705/14, 26, 41
See application file for complete search history.

(56) References Cited

U.S. PATENT DOCUMENTS

| | | | |
|---|---|---|---|
| 3,634,669 A | 1/1972 | Soumas et al. |
| 3,946,206 A | 3/1976 | Darjany |
| 4,047,033 A | 9/1977 | Malmberg |
| 4,465,206 A | 8/1984 | Sorel et al. |
| 4,545,838 A | 10/1985 | Minkus |
| 4,582,985 A | 4/1986 | Lofberg |
| 4,594,663 A | 6/1986 | Nagata et al. |
| 4,614,861 A | 9/1986 | Pavlov et al. |
| 4,634,845 A | 1/1987 | Riley |
| 4,642,768 A | 2/1987 | Roberts |

(Continued)

FOREIGN PATENT DOCUMENTS

CA  2293321  12/1998

(Continued)

OTHER PUBLICATIONS

Power, Denise. "Loehmann's Compiles Shopper Data Via Credit Card." DNR, vol. 28, No. 3, p. 6, Jan. 7, 1998.*

(Continued)

*Primary Examiner*—Susanna M. Diaz
(74) *Attorney, Agent, or Firm*—Hunton & Williams LLP

(57) ABSTRACT

A method of issuing a purchase card is provided. The method includes the steps of presenting a purchaser with the opportunity to buy the purchase card, determining whether the purchaser has sufficient funds to pay for the purchase card, creating a purchase card account for a recipient designated by the purchaser, and issuing the purchase card. The purchase card may also be issued in connection with another credit card, for example as a rebate for purchases on the credit card. The purchase card may also be converted to a credit card.

115 Claims, 2 Drawing Sheets

U.S. PATENT DOCUMENTS

| | | |
|---|---|---|
| 4,689,478 A | 8/1987 | Hale et al. |
| 4,700,055 A | 10/1987 | Kashkashian |
| 4,746,787 A | 5/1988 | Suto et al. |
| 4,750,119 A | 6/1988 | Cohen |
| 4,752,676 A | 6/1988 | Leonard et al. |
| 4,754,418 A | 6/1988 | Hara |
| 4,766,293 A | 8/1988 | Boston |
| 4,766,539 A | 8/1988 | Fox |
| 4,789,928 A | 12/1988 | Fujisaki |
| 4,822,985 A | 4/1989 | Boggan et al. |
| 4,831,242 A | 5/1989 | Englehardt |
| 4,831,526 A | 5/1989 | Luchs |
| 4,868,376 A | 9/1989 | Lessin |
| 4,870,259 A | 9/1989 | Boggan et al. |
| 4,882,675 A | 11/1989 | Nichtberger |
| 4,897,533 A | 1/1990 | Lyszczarz |
| 4,906,826 A | 3/1990 | Spencer |
| 4,908,521 A | 3/1990 | Boggan et al. |
| 4,923,288 A | 5/1990 | Allen |
| 4,928,001 A | 5/1990 | Masada |
| 4,941,090 A | 7/1990 | McCarthy |
| 4,943,707 A | 7/1990 | Boggan |
| 4,953,085 A | 8/1990 | Atkins |
| 4,954,985 A | 9/1990 | Yamazaki |
| 4,961,142 A | 10/1990 | Atkins |
| 4,968,873 A | 11/1990 | Dethloff et al. |
| 4,975,840 A | 12/1990 | DeTore et al. |
| 4,978,401 A | 12/1990 | Bonomi |
| 4,992,940 A | 2/1991 | Dworkin |
| 5,025,372 A | 6/1991 | Burton |
| 5,049,728 A | 9/1991 | Rovin |
| 5,055,662 A | 10/1991 | Hasegawa |
| 5,080,748 A | 1/1992 | Bonomi |
| 5,095,194 A | 3/1992 | Barbanell |
| 5,117,355 A | 5/1992 | McCarthy |
| 5,146,068 A | 9/1992 | Ugawa et al. |
| 5,175,416 A | 12/1992 | Mansvelt |
| 5,180,901 A | 1/1993 | Hiramatsu |
| 5,192,947 A | 3/1993 | Neustein |
| 5,202,286 A | 4/1993 | Nakatani |
| 5,202,826 A | 4/1993 | McCarthy |
| 5,206,488 A | 4/1993 | Teicher |
| 5,206,803 A | 4/1993 | Vitagliano |
| 5,214,700 A | 5/1993 | Pinkas et al. |
| 5,218,631 A | 6/1993 | Katz |
| 5,247,190 A | 9/1993 | Friend et al. |
| 5,276,311 A | 1/1994 | Hennige |
| 5,287,268 A | 2/1994 | McCarthy |
| 5,287,269 A | 2/1994 | Dorrough |
| 5,297,026 A | 3/1994 | Hoffman |
| 5,311,594 A | 5/1994 | Penzias |
| 5,326,959 A | 7/1994 | Perazza |
| 5,326,960 A | 7/1994 | Tannenbaum |
| 5,328,809 A | 7/1994 | Holmes et al. |
| 5,339,239 A | 9/1994 | Toshiyuki |
| 5,349,633 A | 9/1994 | Katz |
| 5,350,906 A | 9/1994 | Brody et al. |
| 5,359,183 A | 10/1994 | Skodlar |
| 5,361,062 A | 11/1994 | Weiss et al. |
| 5,365,575 A | 11/1994 | Katz |
| 5,383,113 A | 1/1995 | Knight et al. |
| 5,397,881 A | 3/1995 | Mannik |
| 5,399,502 A | 3/1995 | Friend et al. |
| 5,401,827 A | 3/1995 | Holmes et al. |
| RE34,915 E | 4/1995 | Nichtberger et al. |
| 5,424,524 A | 6/1995 | Ruppert |
| 5,450,477 A | 9/1995 | Amarant |
| 5,453,601 A | 9/1995 | Rosen |
| 5,455,407 A | 10/1995 | Rosen |
| 5,457,305 A | 10/1995 | Akel et al. |
| 5,459,306 A | 10/1995 | Stein |
| 5,465,206 A | 11/1995 | Hilt |
| 5,466,919 A | 11/1995 | Hovakimian |
| 5,471,669 A | 11/1995 | Lidman |
| 5,477,038 A | 12/1995 | Levine |
| 5,477,040 A | 12/1995 | Lalonde |
| 5,479,494 A | 12/1995 | Clitherow |
| 5,482,139 A | 1/1996 | Rivalto |
| 5,483,444 A | 1/1996 | Heintzman |
| 5,483,445 A | 1/1996 | Pickering |
| 5,500,514 A | 3/1996 | Veeneman |
| 5,511,114 A | 4/1996 | Stimson et al. |
| 5,512,654 A | 4/1996 | Holmes et al. |
| 5,513,102 A | 4/1996 | Auriemma |
| 5,521,363 A | 5/1996 | Tannenbaum |
| 5,530,232 A | 6/1996 | Taylor |
| 5,530,235 A | 6/1996 | Stekfik |
| 5,537,314 A | 7/1996 | Kanter |
| 5,544,086 A | 8/1996 | Davis |
| 5,544,246 A | 8/1996 | Mandelbaum |
| 5,553,120 A | 9/1996 | Katz |
| 5,577,109 A | 11/1996 | Stimson |
| 5,578,808 A | 11/1996 | Taylor |
| 5,581,064 A | 12/1996 | Riley et al. |
| 5,585,787 A | 12/1996 | Wallerstein |
| 5,590,038 A | 12/1996 | Pitroda |
| 5,592,560 A | 1/1997 | Deaton et al. |
| 5,604,542 A | 2/1997 | Dedrick |
| 5,608,785 A | 3/1997 | Kasday |
| 5,612,868 A | 3/1997 | Off |
| 5,621,787 A | 4/1997 | Mckoy |
| 5,621,812 A | 4/1997 | Deaton et al. |
| 5,637,845 A | 6/1997 | Kolls |
| 5,638,457 A | 6/1997 | Deaton et al. |
| 5,642,279 A | 6/1997 | Stone |
| 5,642,485 A | 6/1997 | Deaton et al. |
| 5,644,723 A | 7/1997 | Deaton et al. |
| 5,644,727 A | 7/1997 | Atkins |
| 5,649,114 A | 7/1997 | Deaton et al. |
| 5,649,117 A | 7/1997 | Landry |
| 5,649,118 A | 7/1997 | Carlisle |
| 5,653,914 A | 8/1997 | Holmes et al. |
| 5,659,741 A | 8/1997 | Eberhardt |
| 5,664,110 A | 9/1997 | Green |
| 5,664,157 A | 9/1997 | Takahira et al. |
| 5,665,953 A | 9/1997 | Mazzamuto |
| 5,672,678 A | 9/1997 | Holmes et al. |
| 5,675,607 A | 10/1997 | Alesio |
| 5,675,662 A | 10/1997 | Deaton et al. |
| 5,677,955 A | 10/1997 | Doggett |
| 5,684,291 A | 11/1997 | Taskett |
| 5,687,322 A | 11/1997 | Deaton et al. |
| 5,689,100 A | 11/1997 | Carrithers |
| 5,689,650 A | 11/1997 | McClelland |
| 5,692,132 A | 11/1997 | Hogan |
| 5,696,907 A | 12/1997 | Tom |
| 5,699,528 A | 12/1997 | Hogan |
| 5,703,344 A | 12/1997 | Bezy |
| 5,704,046 A | 12/1997 | Hogan |
| 5,705,798 A | 1/1998 | Tarbox |
| 5,708,422 A | 1/1998 | Blonder |
| 5,710,458 A | 1/1998 | Iwasaki |
| 5,710,886 A | 1/1998 | Christensen |
| 5,710,887 A | 1/1998 | Chelliah |
| 5,710,889 A | 1/1998 | Clark et al. |
| 5,715,399 A | 2/1998 | Bezos |
| 5,717,925 A | 2/1998 | Harper et al. |
| 5,721,768 A | 2/1998 | Stimson |
| 5,721,781 A | 2/1998 | Deo et al. |
| 5,726,884 A | 3/1998 | Sturgeon et al. |
| 5,727,153 A | 3/1998 | Powell |
| 5,728,998 A | 3/1998 | Novis et al. |
| 5,729,693 A | 3/1998 | Holda-Fleck |
| 5,734,154 A | 3/1998 | Jachimowicz et al. |

| | | | | | |
|---|---|---|---|---|---|
| 5,734,838 A | 3/1998 | Robinson | 5,926,800 A | 7/1999 | Baronowski |
| 5,736,728 A | 4/1998 | Matsubara | 5,930,217 A | 7/1999 | Kayanuma |
| 5,737,421 A | 4/1998 | Holda-Fleck | 5,931,764 A | 8/1999 | Freeman et al. |
| 5,740,549 A | 4/1998 | Reilly et al. | 5,933,817 A | 8/1999 | Hucal |
| 5,742,775 A | 4/1998 | King | 5,937,068 A | 8/1999 | Audebert |
| 5,745,049 A | 4/1998 | Akiyama et al. | 5,940,811 A | 8/1999 | Norris |
| 5,745,706 A | 4/1998 | Wolfberg et al. | 5,952,641 A | 9/1999 | Korshun |
| 5,749,075 A | 5/1998 | Toader et al. | 5,953,423 A | 9/1999 | Rosen |
| 5,760,381 A | 6/1998 | Stich | 5,953,710 A | 9/1999 | Fleming |
| 5,765,138 A | 6/1998 | Aycock et al. | 5,955,961 A | 9/1999 | Wallerstein |
| 5,765,141 A | 6/1998 | Spector | 5,963,648 A | 10/1999 | Rosen |
| 5,770,843 A | 6/1998 | Rose | 5,970,479 A | 10/1999 | Shepherd |
| 5,770,849 A | 6/1998 | Novis et al. | 5,970,480 A | 10/1999 | Kalina |
| 5,774,870 A | 6/1998 | Storey | 5,974,399 A | 10/1999 | Giuliani et al. |
| 5,777,305 A | 7/1998 | Smith | RE036,365 E | 11/1999 | Levine et al. |
| 5,777,306 A | 7/1998 | Masuda | 5,984,180 A * | 11/1999 | Albrecht .................. 235/380 |
| 5,777,903 A | 7/1998 | Piosenka et al. | 5,984,191 A | 11/1999 | Chapin, Jr. |
| 5,778,067 A | 7/1998 | Jones et al. | 5,987,434 A | 11/1999 | Libman |
| 5,787,156 A | 7/1998 | Katz | 5,988,509 A | 11/1999 | Taskett |
| 5,787,404 A | 7/1998 | Fernandez-Holmann | 5,991,413 A | 11/1999 | Arditti et al. |
| 5,789,733 A | 8/1998 | Jachimowicz et al. | 5,991,743 A | 11/1999 | Irving et al. |
| 5,794,207 A | 8/1998 | Walker | 5,991,748 A | 11/1999 | Taskett |
| 5,799,087 A | 8/1998 | Rosen | 5,991,750 A | 11/1999 | Watson |
| 5,802,176 A | 9/1998 | Audebert | 5,999,596 A | 12/1999 | Walker et al. |
| 5,805,719 A | 9/1998 | Pare et al. | 6,000,608 A | 12/1999 | Dorf |
| 5,806,042 A | 9/1998 | Kelly | 6,000,832 A | 12/1999 | Franklin et al. |
| 5,806,044 A | 9/1998 | Powell | 6,002,383 A | 12/1999 | Shimada |
| 5,806,045 A | 9/1998 | Biorge | 6,003,762 A | 12/1999 | Hayashida |
| 5,807,627 A | 9/1998 | Friend et al. | 6,004,681 A | 12/1999 | Epstein et al. |
| 5,809,478 A | 9/1998 | Greco | 6,006,988 A | 12/1999 | Behrmann et al. |
| 5,815,657 A | 9/1998 | Williams et al. | 6,009,415 A | 12/1999 | Shurling et al. |
| 5,815,658 A | 9/1998 | Kuriyama | 6,014,636 A | 1/2000 | Reeder |
| 5,819,234 A | 10/1998 | Slavin et al. | 6,014,638 A | 1/2000 | Burge et al. |
| 5,819,237 A | 10/1998 | Garman | 6,014,645 A | 1/2000 | Cunningham |
| 5,826,243 A | 10/1998 | Musmanno et al. | 6,014,749 A | 1/2000 | Gloor et al. |
| 5,832,457 A | 11/1998 | O'Brien | 6,016,482 A | 1/2000 | Molinari et al. |
| 5,832,488 A | 11/1998 | Eberhardt | 6,016,954 A | 1/2000 | Abe et al. |
| 5,835,061 A | 11/1998 | Stewart | 6,019,284 A | 2/2000 | Freeman et al. |
| 5,835,576 A | 11/1998 | Katz | 6,026,370 A | 2/2000 | Jermyn |
| 5,839,113 A | 11/1998 | Federau et al. | 6,029,139 A | 2/2000 | Cunningham et al. |
| 5,845,259 A | 12/1998 | West | 6,029,890 A | 2/2000 | Austin |
| 5,845,260 A | 12/1998 | Nakano et al. | 6,032,136 A | 2/2000 | Brake, Jr. et al. |
| 5,852,811 A | 12/1998 | Atkins | 6,036,099 A | 3/2000 | Leighton |
| 5,852,812 A | 12/1998 | Reeder | 6,038,292 A | 3/2000 | Thomas |
| 5,857,079 A | 1/1999 | Claus | 6,038,552 A | 3/2000 | Fleischl et al. |
| 5,857,175 A | 1/1999 | Day | 6,041,315 A | 3/2000 | Pollin |
| 5,857,709 A | 1/1999 | Chock | 6,045,042 A | 4/2000 | Ohno |
| 5,859,419 A | 1/1999 | Wynn | 6,047,067 A | 4/2000 | Rosen |
| 5,864,609 A | 1/1999 | Cross | 6,047,268 A | 4/2000 | Bartoli et al. |
| 5,864,828 A | 1/1999 | Atkins | 6,049,463 A | 4/2000 | O'Malley et al. |
| 5,864,830 A | 1/1999 | Armetta | 6,049,773 A | 4/2000 | McCormack et al. |
| RE36,116 E | 2/1999 | McCarthy | 6,049,782 A | 4/2000 | Gottesman et al. |
| 5,870,718 A | 2/1999 | Spector | 6,058,378 A | 5/2000 | Clark et al. |
| 5,870,721 A | 2/1999 | Norris | 6,064,985 A | 5/2000 | Anderson |
| 5,875,437 A | 2/1999 | Atkins | 6,065,675 A | 5/2000 | Teicher |
| 5,883,377 A | 3/1999 | Chapin, Jr. | 6,068,183 A | 5/2000 | Freeman et al. |
| 5,883,810 A | 3/1999 | Franklin | 6,070,067 A | 5/2000 | Nguyen et al. |
| 5,884,271 A | 3/1999 | Pitroda | 6,070,147 A | 5/2000 | Harms et al. |
| 5,884,278 A | 3/1999 | Powell | 6,070,153 A | 5/2000 | Simpson |
| 5,884,285 A | 3/1999 | Atkins | 6,076,068 A | 6/2000 | DeLapa et al. |
| 5,887,065 A | 3/1999 | Audebert | 6,076,072 A | 6/2000 | Libman |
| 5,890,138 A | 3/1999 | Godin et al. | 6,078,888 A | 6/2000 | Johnson, Jr. |
| 5,890,140 A | 3/1999 | Clark et al. | 6,078,891 A | 6/2000 | Riordan et al. |
| H1794 H | 4/1999 | Claus | 6,091,817 A | 7/2000 | Bertina et al. |
| 5,897,620 A | 4/1999 | Walker et al. | 6,092,056 A | 7/2000 | Tull, Jr. et al. |
| 5,905,246 A | 5/1999 | Fajkowski | 6,095,412 A | 8/2000 | Bertina et al. |
| 5,911,135 A | 6/1999 | Atkins | 6,095,416 A | 8/2000 | Grant et al. |
| 5,911,136 A | 6/1999 | Atkins | 6,098,053 A | 8/2000 | Slater |
| 5,914,472 A | 6/1999 | Foladare et al. | 6,105,011 A | 8/2000 | Morrison, Jr. |
| 5,920,629 A | 7/1999 | Rosen | 6,105,865 A | 8/2000 | Hardesty |
| 5,920,844 A | 7/1999 | Hotta et al. | 6,109,525 A | 8/2000 | Blomqvist et al. |
| 5,920,847 A | 7/1999 | Kolling et al. | 6,112,191 A | 8/2000 | Burke |
| 5,923,734 A | 7/1999 | Taskett | 6,115,458 A | 9/2000 | Taskett |

| | | | | | |
|---|---|---|---|---|---|
| 6,119,097 | A | 9/2000 | Ibarra | 6,687,222 B1 | 8/2003 Mittal et al. |
| 6,119,932 | A | 9/2000 | Maloney et al. | RE038,255 E | 9/2003 Levine et al. |
| 6,122,623 | A | 9/2000 | Garman | 6,615,189 B1 | 9/2003 Phillips et al. |
| 6,128,598 | A | 10/2000 | Walker et al. | 6,615,190 B1 | 9/2003 Slater |
| 6,128,599 | A | 10/2000 | Walker et al. | 6,625,582 B2 | 9/2003 Richman et al. |
| 6,129,274 | A | 10/2000 | Suzuki | 6,631,849 B2 | 10/2003 Blossom |
| 6,134,536 | A | 10/2000 | Shepherd | 6,641,049 B2 | 11/2003 Luu |
| 6,138,917 | A | 10/2000 | Chapin, Jr. | 6,641,050 B2 | 11/2003 Kelley et al. |
| 6,145,741 | A | 11/2000 | Wisdom et al. | 6,675,127 B2 | 1/2004 LaBlanc et al. |
| 6,148,297 | A | 11/2000 | Swor et al. | 6,693,544 B1 | 2/2004 Hebbecker |
| 6,161,096 | A | 12/2000 | Bell | 6,742,704 B2 | 6/2004 Fitzmaurice et al. |
| 6,163,770 | A | 12/2000 | Gamble et al. | 6,745,938 B2 | 6/2004 Sullivan |
| 6,164,533 | A | 12/2000 | Barton | 6,757,710 B2 | 6/2004 Reed |
| 6,167,385 | A | 12/2000 | Hartley Urquhart | 6,802,008 B1 | 10/2004 Ikefuji et al. |
| 6,169,975 | B1 | 1/2001 | White et al. | 6,805,287 B2 | 10/2004 Bishop |
| 6,173,267 | B1 | 1/2001 | Cairns | 6,865,547 B1 | 3/2005 Brake, Jr. et al. |
| 6,182,048 | B1 | 1/2001 | Osborn et al. | 6,868,426 B1 | 3/2005 Mankoff |
| 6,182,894 | B1 | 2/2001 | Hackett et al. | 6,876,971 B1 | 4/2005 Burke |
| 6,186,793 | B1 | 2/2001 | Brubaker | 6,895,386 B1 | 5/2005 Bachman et al. |
| 6,189,787 | B1 | 2/2001 | Dorf | 6,901,372 B1 | 5/2005 Helzerman |
| 6,192,113 | B1 | 2/2001 | Lorsch | 6,912,502 B1 | 6/2005 Buddle et al. |
| 6,195,644 | B1 | 2/2001 | Bowie | 6,970,830 B1 | 11/2005 Samra et al. |
| 6,202,053 | B1 | 3/2001 | Christiansen et al. | 6,999,943 B1 | 2/2006 Johnson et al. |
| RE37,122 | E | 4/2001 | Levine et al. | 7,006,992 B1 | 2/2006 Packwood |
| RE037,122 | E | 4/2001 | Levine et al. | 7,051,925 B2 | 5/2006 Schwarz, Jr. |
| 6,223,143 | B1 | 4/2001 | Weinstock et al. | 7,072,864 B2 | 7/2006 Brake et al. |
| 6,227,447 | B1 | 5/2001 | Campisano | 7,089,503 B1 | 8/2006 Bloomquist et al. |
| 6,243,688 | B1 | 6/2001 | Kalina | 7,104,443 B1 | 9/2006 Paul et al. |
| 6,263,316 | B1 | 7/2001 | Khan et al. | 7,165,049 B2 | 1/2007 Slater |
| 6,265,977 | B1 | 7/2001 | Vega et al. | 2001/0011243 A1 | 8/2001 Dembo et al. |
| 6,278,981 | B1 | 8/2001 | Dembo et al. | 2001/0027441 A1 | 10/2001 Wankmueller |
| 6,295,522 | B1 | 9/2001 | Boesch | 2001/0034682 A1 | 10/2001 Knight et al. |
| 6,298,336 | B1 | 10/2001 | Davis et al. | 2001/0037315 A1 | 11/2001 Saliba et al. |
| 6,308,268 | B1 | 10/2001 | Audebert | 2001/0044293 A1 | 11/2001 Morgan |
| 6,336,099 | B1 | 1/2002 | Barnett et al. | 2001/0047342 A1 | 11/2001 Cuervo |
| 6,338,048 | B1 | 1/2002 | Mori | 2001/0054003 A1 | 12/2001 Chien et al. |
| 6,341,724 | B2 | 1/2002 | Campisano | 2001/0056398 A1 | 12/2001 Scheirer |
| 6,343,743 | B1 | 2/2002 | Lamla | 2002/0019803 A1 | 2/2002 Muller |
| 6,345,261 | B1 | 2/2002 | Feidelson et al. | 2002/0026418 A1 | 2/2002 Koppel et al. |
| 6,345,766 | B1 | 2/2002 | Taskett et al. | 2002/0046255 A1 | 4/2002 Moore et al. |
| 6,349,291 | B1 | 2/2002 | Varma | 2002/0062235 A1 | 5/2002 Wahlbin et al. |
| 6,360,954 | B1 | 3/2002 | Barnardo | 2002/0077978 A1 | 6/2002 Oleary et al. |
| 6,366,220 | B1 | 4/2002 | Elliott | 2002/0091572 A1 | 7/2002 Anderson et al. |
| 6,373,969 | B1 | 4/2002 | Adler | 2002/0091631 A1 | 7/2002 Usui |
| 6,377,669 | B1* | 4/2002 | Walker et al. ......... 379/144.05 | 2002/0095365 A1 | 7/2002 Slavin |
| 6,385,591 | B1 | 5/2002 | Mankoff | 2002/0104878 A1 | 8/2002 Seifert et al. |
| 6,386,444 | B1 | 5/2002 | Sullivan | 2002/0116271 A1 | 8/2002 Mankoff |
| 6,397,202 | B1 | 5/2002 | Higgins et al. | 2002/0116330 A1 | 8/2002 Hed et al. |
| 6,402,039 | B1 | 6/2002 | Freeman et al. | 2002/0120627 A1 | 8/2002 Mankoff |
| 6,405,182 | B1 | 6/2002 | Cuervo | 2002/0120642 A1 | 8/2002 Fetherston |
| 6,422,459 | B1 | 7/2002 | Kawan | 2002/0143703 A1 | 10/2002 Razvan |
| 6,422,462 | B1 | 7/2002 | Cohen | 2002/0147662 A1 | 10/2002 Anderson |
| 6,424,029 | B1 | 7/2002 | Giesler | 2002/0165820 A1 | 11/2002 Anvekar et al. |
| 6,429,927 | B1 | 8/2002 | Borza | 2002/0174016 A1 | 11/2002 Cuervo |
| 6,434,259 | B1 | 8/2002 | Hamid | 2002/0194081 A1 | 12/2002 Perkowski |
| 6,446,210 | B1 | 9/2002 | Borza | 2003/0004828 A1 | 1/2003 Epstein |
| 6,450,407 | B1 | 9/2002 | Freeman et al. | 2003/0023549 A1 | 1/2003 Armes et al. |
| 6,463,039 | B1 | 10/2002 | Ricci et al. | 2003/0028518 A1 | 2/2003 Mankoff |
| 6,467,684 | B2 | 10/2002 | Fite et al. | 2003/0033211 A1 | 2/2003 Haines et al. |
| 6,473,500 | B1 | 10/2002 | Risafi et al. | 2003/0033246 A1 | 2/2003 Slater |
| 6,484,144 | B2 | 11/2002 | Martin et al. | 2003/0046249 A1 | 3/2003 Wu |
| 6,484,148 | B1 | 11/2002 | Boyd | 2003/0053609 A1 | 3/2003 Risafi et al. |
| 6,498,861 | B1 | 12/2002 | Hamid | 2003/0101119 A1 | 5/2003 Persons et al. |
| 6,505,168 | B1 | 1/2003 | Rothman et al. | 2003/0105672 A1 | 6/2003 Epstein et al. |
| 6,505,780 | B1 | 1/2003 | Yassin et al. | 2003/0135462 A1 | 7/2003 Brake, Jr. et al. |
| 6,529,880 | B1 | 3/2003 | McKeen et al. | 2003/0140004 A1 | 7/2003 Oleary et al. |
| 6,557,750 | B1 | 5/2003 | Druse et al. | 2003/0144935 A1 | 7/2003 Sobek |
| 6,560,578 | B2 | 5/2003 | Eldering | 2003/0154125 A1 | 8/2003 Mittal et al. |
| 6,574,603 | B1 | 6/2003 | Dickson et al. | 2003/0163403 A1 | 8/2003 Chen et al. |
| 6,581,839 | B1 | 6/2003 | Lasch et al. | 2003/0163416 A1 | 8/2003 Kitajima |
| 6,601,040 | B1 | 7/2003 | Kolls | 2003/0172040 A1 | 9/2003 Kemper et al. |
| 6,601,761 | B1 | 8/2003 | Katis | 2003/0195808 A1 | 10/2003 Brown et al. |
| 6,609,111 | B1 | 8/2003 | Bell | 2003/0200143 A9 | 10/2003 Walker et al. |

| | | | |
|---|---|---|---|
| 2003/0200180 A1 | 10/2003 | Phelan et al. | |
| 2003/0216965 A1 | 11/2003 | Libman | |
| 2004/0024672 A1 | 2/2004 | Brake, Jr. et al. | |
| 2004/0030626 A1 | 2/2004 | Libman | |
| 2004/0039588 A1 | 2/2004 | Libman | |
| 2004/0059952 A1 | 3/2004 | Newport et al. | |
| 2004/0093296 A1 | 5/2004 | Phelan et al. | |
| 2004/0093303 A1 | 5/2004 | Picciallo | |
| 2004/0098351 A1 | 5/2004 | Duke | |
| 2004/0243498 A1 | 12/2004 | Duke | |
| 2005/0021400 A1 | 1/2005 | Postrel | |
| 2005/0027649 A1 | 2/2005 | Cech | |
| 2005/0071230 A1 | 3/2005 | Mankoff | |
| 2005/0075932 A1 | 4/2005 | Mankoff | |
| 2005/0077350 A1 | 4/2005 | Courtion et al. | |
| 2005/0091138 A1 | 4/2005 | Awatsu | |
| 2005/0171898 A1 | 8/2005 | Bishop et al. | |
| 2006/0047589 A1 | 3/2006 | Grau | |

FOREIGN PATENT DOCUMENTS

| | | |
|---|---|---|
| EP | 0 843 292 A2 | 5/1998 |
| EP | 0 855 659 | 7/1998 |
| EP | 959440 | 11/1999 |
| GB | 2275654 A | 9/1994 |
| GB | 2376787 | 12/2002 |
| GB | 2377071 | 12/2002 |
| GB | 2377314 | 1/2003 |
| WO | WO 94/29112 | 12/1994 |
| WO | WO 97/41673 | 11/1997 |
| WO | WO 98/59307 | 12/1998 |
| WO | WO 99/05633 | 2/1999 |
| WO | WO 01/69347 A2 | 9/2001 |
| WO | WO 2005/043277 A2 | 5/2005 |

OTHER PUBLICATIONS

Anonymous. "Association of Incentive Gift Certificate Suppliers." Incentive, vol. 169, No. 8, pp. SS1-SS23, Aug. 1995.*

"Smart Cards Forging into Credit Card Market." Card News, vol. 10, No. 6, p. 1(3), Apr. 3, 1995.*

Definition of "Stored-value card" from Wikipedia. Retrieved from [URL: http://en.wikipedia.org/wiki/Stored-value_card] on Apr. 16, 2007.*

Song, Time Magazine Article, Monday, Apr. 12, 2004, "A card that asks for ID", 1 page.

Credit Card News, "A store card issuer looks for lift from electronic gift certificates," Feb. 1, 1995, 2 pages.

"Associates First Capital Corporation", Hoover's Inc., The Industry Standard: The Newsmagazine of the Internet Economy, thestandard. net/companies/cpmpany-display, Apr. 6, 1999, 2 pages.

Brehl, "Banks issue cash-card pledge," The Toronto Star, Thursday, Oct. 9, 1997, 1 page.

Block, "Blockbuster running test of stored value card," The American Banker, Sep. 1, 1995, 2 pages.

Meece, "Boatmen's prepaid cards for worker-incentive firm," American Banker, Jul. 2, 1996, p. 12.

"Boatmen's floats stored value into the employee incentive waters," Debit card News, vol. 2, Issue 2, Jul. 16, 1996, 3 pages.

CardEx Incentives, The Future of Gifts & Incentives, Apr. 6, 1999, 15 pages.

Rosen, "Cash just isn't flexible enough," Express Technology, Friday, Feb. 10, 1995, 1 page.

Business Wire, Jan. 15, 1996, "CES/NaBANCO Introduces stored value card technology; Blockbuster video is first merchant partner," 2 pages.

Britt, "Competing in auto lending," America's Community Banker, vol. 5, No. 11; pp. 33-37, Nov. 1996.

Card News, "D.C. area Safeway stores look for increase in sales volume and revenue with cards," vol. 6, No. 25, ISSN: 0894-0797, Monday, Dec. 30, 1991, 3 pages.

Piskora, "Debit cards seen poised for new markets," American Banker, Credit/Debit/ATM's, Tuesday, Mar. 7, 1995, p. 16.

Sanchez-Klein, "Electronic purse alliance planned," Computerworld, Jul. 29, 1998, printed Feb. 23, 2001, 2 pages.

Business Times, "Electronic purse can free you from ATM drag," printed Feb. 23, 2001, 1 page.

News Clippings, "Electronic purse card' to be launched tomorrow," New Straits Times, Sep. 18, 1999, printed Feb. 23, 2001, 3 pages.

Cards International, Jan. 30, 1996, "First data markets stored-value cards," p. 5.

Norris, First data unit develops blockbuster cash card, Omaha World Herald, Jan. 19, 1996, Sunrise Edition, p. 16.

Welcome to Card Express, The CardEx Incentive Card, as disclosed in the CardEx web site archived by web.archive.org on Feb. 7, 1998 [http://web.archive.org/web/*/http://www.cardex.com], retrieve Oct. 18, 2003, 8 pages.

Welcome to Card Express, CardEx web site archived by web. archive.org on Oct. 31, 1996 [http://web.archive.org/web/*/http://www.cardex.com], retrieve Oct. 18, 2003, 7 pages.

Jeffrey M. Lacker, "Stored Value Cards: Costly Private Substitutions for Government Currency", Economic Quarterly, 1996, 17 pages.

"The Evolution of a New Consumerism", Chain Store Age, vol. 73, pp. 8-9, Jun. 1997, 1 page.

Fickenscher, "Amex prepaid offering is latest card for firms regarding employoees", American Banker, vol. 161; No. 151, Aug. 8, 1996, 2 pages.

"Welcome to Swiftgift", Swiftgift, www.swiftgiftcard.com, Dec. 8, 1998, 10 pages.

Lzarony, "Stuck for a gift? Give a prepaid credit card", www. bankrate.com, Dec. 21, 1998, 1 page.

Coulton, "Incentives field moving to card-based series 14", American Banker, Mar. 26, 1998, 3 pages.

Business Travel News, "Maritz gets mastercard's stamp of approval", Aug. 19, 1996, 2 pages.

Spurgin, "Sopininmon! or What's happening in the retail credit card environment", Credit World Journal, Apr. 1997, 7 pages.

AT&T Marketing, "Universal card free lifetime membership extended 3 months", www.att.com/press/0297/970217.csa.html, Dec. 4, 1990, 2 pages.

Chain Store Age Executive with Shopping Center Age, "More retailiers turn to co-branding", Feb. 1, 1995, 3 pages.

Introducing SpendingMoney(TM), Armetta: Marketing & Design Product Concept Report, Oct. 9, 1996, 15 pages.

First USA Platinum Connect, First USA Bank, First USA Promotional Mailing, Oct. 1997, 6 pages.

Introducing the First USA Platinum Connect Card, First USA Promotional Mailing, Dec. 1997, 6 pages.

Here's the calling convenience you asked for: 1-800-call-AT&T . . . For All Calls, Appendix A: For Card Carriers, 7 pages.

Miriam Krenin Souccar, Smart Cards: 1st Union Smart Card Pilot Enlists a Second Army Base, American Banker, 3 pages.

First Union Issues Smart Cards to Fort Benning Recruits, CardFax, 1 page, Mar. 26, 1999.

Emerson Brown and Jim Baum, Purchasing Card Magic: Eli Lilly Finds Accounts Payable Flying High With Plastic, Corporate Cashflow, 4 pages, Nov. 1994.

Christine Dugas, Payroll May Ask: Paper or Plastic?, USA Today, 3B, Aug. 14, 2001, 1 page.

Rachel Konrad, Associated Press, IBM had a bunch of unususal ideas in 2003, printed from Philly.com on Jan. 21, 2004, posted on Tues., Jan. 13, 2004, 2 pages.

Incentive firms find debit cards a rewarding experience (Off-line debit card issuers converge efforts with companies looking for effective incentives to boost employee productivity and to motivate individuals to buy their products), Debit Card News, vol. 3, No. 11, Nov. 28, 1997, (Author unknown), 3 pages.

News Release, For Release: Monday, Feb. 17, 1997, New 1-800-CALL-ATT campaign promotes one number for all calls, 2 pages.

S. P. Miller et al., Section E.2. 1: Kerberos Authentication and Authorization System, Project Athena, Cambridge, Massachusetts, Dec. 21, 1987, 39 pages.

Swift Gift 'Wows' Internet Shoppers, Wed., Dec. 2, 1998, PR Newswire, 1 page (Author Unknown).

ECARD, Frequently asked questions, printed Feb. 23, 2001, 7 pages.
Machilis, Computerworld, "Have it the 'smart' way: Burger King program drives smart-card use", printed Feb. 23, 2001, 1 page.
Press Release, Mar. 5, 2004, Payment data systems files patent on debit card payment solution, American City Business Journals, 1 page.
Press release '99, "Proton world and Europay to co-operate in creation of new CEPS-compliant E-purse application," printed Feb. 23, 2001, Waterloo, Belgium, 28, Jun. 1999, 2 pages.
SCIA (Smart Card Industry Association), About Smart Cards, "Electronic Purse," printed Feb. 23, 2001, www.scia.org, 1 page.
Cordis, PACE IST-1999-11531 PACE, "Purse application for cross border use in euro," printed Feb. 23, 2001, www.cordis.lu, 3 pages.
SK100 Smart Card Electronic Purse Balance Reader, printed Feb. 23, 2001, 1 page.
Press Release, Apr. 21, 1997, Smart card for loyalty and e-purse applications eclipses capability of conventional mag-stripe cards, printed Feb. 23, 2001, 3 pages, www.1.sib.com.
SmartAxis, Load cash on to your e-purse card, Supported Currencies and Schemes, printed Feb. 23, 2001, www.smartaxis.co.uk, 9 pages.
"The Electronic Purse Reaches the Car Park", printed Feb. 23, 2001, 2 pages.
Stuber, Bank of Canada, "The electronic purse: An overview of recent developments and issues," Technical Report No. 74, Jan. 1996, printed Feb. 23, 2001, www.bankofcanada.ca, 2 pages.
ICL, Understanding the benefits, "Smartcity offers a number of important benefits to both the card issuers and the customers," printed Feb. 27, 2001, www.icl.com, 2 pages.
Visa first to launch electronic purse load via GSM mobile phone, Johannesburg, Apr. 7, 1999, printed Feb. 23, 2001, www.cellular.co, 4 pages.
Hansell, New York Times, "Visa to unveil electronic purse cards," printed Feb. 23, 2001, 2 pages.
Machlis et al., "Will smart cards replace ATMs?," Computerworld, printed Feb. 23, 2001, 3 pages.
Hotchkiss, D. Anne, "ATM's at the head of their class," Bank Marketing, vol. 29, No. 3, pp. 26-32, Mar. 1997.
Meridian Award Cards, JA8251.
Meridian—the leader in card marketing, JA8343.
Incenticard, JA8329.
Card Based Award Systems, JA8309.
*Meridicard* vs. *Debit Cards*, JA7917.
Award Card Comparison, JA7922.
How is it Different?, JA8331.
5500—FDIC General Counsel's Opinion No. 8—Stored Value Cards, 61 Fed. Reg. 40490, http://www.fdic.gov/regulations/laws/rules/5500-500.html, Aug. 2, 1996.
Edwards, ATMs The Hot New Media Buy, ABA Banking Journal Mar. 1999, pp. 58, 60.
Neumann, An Enhanced Neural Network Technique for Software Risk Analysis, IEEE Transactions on Software Engineering, vol. 28, No. 9, Sep. 1, 2002, pp. 904-912.
CardFlash, Apr. 5, 2005.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Bank, Cash, Check,Charge—What's Next?, Seattle Times, Mar. 6, 1995.
Morgan et al., Categorizing Risks for Risk Ranking, vol. 20, No. 1, Jun. 22, 2005, pp. 49-58.
Common electronic purse specifications, Business Requirements, Version 6.0, Dec. 1998.
Guidotti, Comparing Environmental risks: A Consultative Approach to Setting Priorities at the Community Level, Public Health Rev 1994, vol. 22, Jun. 16, 2005, pp. 321-337.
Consortium created to manage common electronic purse specification, Cardtech Securtech, Chicago, www.visa.com/av/news/PRmisc051199.vhtml, May 11, 1999.

Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.
Lamond, Credit Card Transactions Real World and Online, Paying By Credit Card-Real World and Online, http://www.virtualschool.edu/mon/ElectronicProperty/klamond/credit, printed Jul. 8, 2005, 17 pages.
E-Z Pass, Web page, http://www.ezpass.com-Disc_portNewYork.html, Nov. 12, 2001.
E-Z Pass, Web page, http:\\www.ezpass.com-Disc_ny_annual.html, Nov. 12, 2001.
E-Z Pass, Web page, http:\\www.ezpass.com-frameMain.html, Nov. 12, 2001.
E-Z Pass, Web page, http:\\www.ezpass.com-whatis.html, Nov. 12, 2001.
First USA—Activate Today and Get One Hour Free Calling Card Calls, Call 1-800-555-2535, First USA, 6 pages.
First USA—Call 1(800)335-2453 To Receive One Free Hour of Domestic Long Distance Calling (No Strings Attached), First USA, 6 pages.
Hoovers, General Mills, Inc. Corporate Profile relied upon to show the history of the company, http:/cobrands.hoovers.com/global/cobrands/proquest/history.xhtml?COID=10639, Jul. 12, 2005, 2 pages.
Key Bank Holiday Offer, http://www.key.com/swiftgift/home.html, printed Apr. 5, 1999.
MailFrontier Survey Finds that Consumers Hold Financial Institutions Accountable for Online Identitiy Theft, www.mailfrontier.com, Palo Alto, CA, Nov. 2004.
Clark, Microsoft, Visa to Jointly Develop PC Electronic-Shopping Software, The Wall Street Journal, Nov. 9, 1994, WSJ B9.
Bogle, Mutual Funds at the Millennium: Fund Directors and Fund Myths, The Vanguard Group to the '40 Act Institute of PLI (Practicing Law Institute), New York, NY, May 15, 2000, 15 pages.
Schwab, Charles, Now 7 Ways For A better Total Return For Your Money; Schwat 1, The Inventor's Asset Management Account, Charles R. Schwab, Charles Schwab & Co., Inc., 16 pages.
Smart Cards: Big Brother's Little Helpers, The Privacy Committee of New South Wales, No. 66, Aug. 1995.
The Campus Card Conundrum, Card Technology, Journal ISSN: 1093-1279, p. 25+, Feb. 1998, pp. 1-8.
Stoughton, The Gift of Credit, www.washingtonpost.com/wp-srv/business, Dec. 14, 1998.
Langheinrich et al., Unintrusive Customization Techniques for Web Advertising, Computer Networks, vol. 31, 1999, pp. 1259-1272.
Visa Cash—Where can I get it?, www.visa-asia.com/pd/cash/where.html, Feb. 23, 2001.
Visa Cash, www.visa.asia.com/pd/cash/main.html, Feb. 23, 2001.
Visa International And SERMEPA Announce Plans For Cross Border Visa Cash Based On CEPS, www.visa.com/av/news/praaamisc111699.vhtml, Nov. 16, 1999.
Visa releases visa cash electronic purse specifications based on CEPS, www.visa.com/av/news/PRaamisc042099.vhtml, San Francisco, Apr. 20, 1999.
Machlis et al., Will smart cards replace ATMS?, Computerworld, printed Feb. 23, 2001, 3 pages.
U.S. Appl. No. 11/619,908, filed Jan. 4, 2007, Slater.
U.S. Appl. No. 11/443,289, filed May 31, 2006, Slater.
Claessens, et al., A Tangled World Wide Web of Security Issues, First Monday, retrieved from the internet at http://www.firstmonday.org/issues/issue7_3/claessens, retrieved from the internet on Oct. 6, 2006.
American Express Incentive Services, Incentive, Sep. 1996, p. 126.
Nora Wood, Corporate Spotlight, Incentive, Dec. 1997, 4 pages.
Eight Keys to Making the Right Choice, Incentive, Dec. 1996, 9 pages.
D. O'Mahony, Electronic Payment System, 1997, Artech House, XP002137255, p. 7-11.
Exclusively Yours From Maritz . . . The MasterCard Card Ultimate Incentive, Incentive, Oct. 1995, 3 pages.
Block, First Data Subsidiary Creates Payroll Card for the Bankless, LexisNexis Academic, Credit/Debit/ATMs, p. 10, Mar. 21, 1997.

Judy Quinn, Incentive Cards Explained, Incentive, Dec. 1995, 5 pages.

Vincent Alonzo, Incentive Marketing . . . Three If By Smart Card, Incentive Sep. 1995, p. 11.

Incentive gift Card: Another way to give the gift of choice!, Incentive, Aug. 1995, 2 pages.

LexisNexis Academic, Debit Card Innovation, vol. XXXV, No. 5, p. 2, May 1997.

LexisNexis Academic, Debit Cards: Payroll Card Ups Fees, Future Banker, p. 18, Oct. 6, 1997.

LexisNexis Academic, NTS' TransPay Debit Card Helps Remote and Unbanked Employees Get Funds Quicker, Financial News, Mar. 18, 1997.

Maritz, Incentive, Jun. 1996, p. 111.

Allen et al., Overview of Smart Cards and the Industry, Smart Cards: Seizing Strategic Business Opportunities, Chapter 1, p. 2-20, Irwin Professional Publishing, 1997.

Paper or Plastic? With these three incentives, The Choice is Yours, Incentive, Feb. 1996, 2 pages.

The Federal Transit Administration, TCRP Report 32 Multipurpose Transit Payment Media, Chapter 2 Multipurpose Fare Payment: Overview, p. 10-20.

Nora Wood, The Power of the Card, Incentive, Jul. 1997, 6 pages.

Kenneth Hein, What's the Deal?, Incentive, Jul. 1998, 7 pages.

Definition of "Stored Value Card" from Wikipedia. Retrieved from http:en.wikipedia.org/wiki/Stored-value_card on Apr. 16, 2007.

* cited by examiner

DEBIT PURCHASING OF STORED VALUE CARD FOR USE BY AND/OR DELIVERY TO OTHERS

This patent application is a Continuation of U.S. Pat. application No. 10/441,067, filed on May 20, 2003 entitled "Debit Purchasing of Stored Value Card For Use By And/Or Delivery To Others", which is a continuation of U.S. Pat. application No. 09/102,044, filed June 22, 1998, now U.S. Pat. No. 6,615,189. The disclosures of these priority applications are hereby incorporated herein by reference in their entirety.

The present application is also related concurrently herewith, U.S. Pat. application No. 10/987,079 filed concurrently herewith, U.S. Pat. application No. 10/987,085 filed concurrently herewith, U.S. Pat. application No. 10/987,104 filed concurrently herewith, and U.S. Pat. application No. 10/987,078 filed concurrently herewith, all claiming benefit of U.S. Pat. application No. 10/441,067, filed on May 20, 2003 entitled "Debit Purchasing of Stored Value Card For Use By And/Or Delivery To Others, which is a continuation of U.S. Pat. application No. 09/102,044, filed June 22, 1998, now U.S. Pat. No. 6,615,189, all of which are entitled "Debit Purchasing of Stored value Card For Use By And/Or Delivery To Others", the entireties of which are incorporated by reference herein.

FIELD OF THE INVENTION

This invention relates to a system for purchasing or transferring of stored value or debit purchasing cards, which can be pre-arranged to be given as a gift to a designated recipient.

BACKGROUND OF THE INVENTION

On many occasions, consumers, other bank customers, credit card holders, and other persons find it is desirable to arrange for another person, perhaps a relative, to have access to a specified sum of money. For example, a parent might want to arrange for a child to have access to money when the child is taking a trip or going away to college. One may also find it desirable to mail a gift to another person who is geographically distant. In these and other cases, it is often undesirable to give away or send cash. If lost or stolen, cash is practically unrecoverable. Traveler's checks are also undesirable as they must be purchased at a bank and are not acceptable for many types of purchases. Gift certificates are also undesirable because they require the recipient to purchase from the merchant that issued the gift certificate. These and other drawbacks exist to the aforementioned alternatives.

SUMMARY OF THE INVENTION

An object of the invention is to overcome these and other drawbacks in existing purchase schemes.

Another object of the invention is to provide a method for issuing a purchase card comprising: presenting a purchaser with the opportunity to buy the purchase card, determining whether the purchaser has sufficient funds to pay for the purchase card, creating a purchase card account for a recipient designated by the purchaser; and issuing the purchase card.

A further object of the invention is to provide a purchase card where the recipient activates the purchase card.

A further object of the invention is to provide a purchase card where the purchase card account contains a monetary amount determined by the purchaser of the purchase card.

A further object of the invention is to provide a purchase card where money can be added to the balance of an issued purchase card account.

A further object of the invention is to provide a purchase card where the purchase card is activated when the issuer of the purchase card is notified that the recipient has received the purchase card.

A further object of the invention is to provide a purchase card where the issuer of the purchase card notifies the purchaser that the recipient has received the purchase card.

A further object of the invention is to provide a purchase card where the purchaser may designate with which merchants the purchase card may be used.

A further object of the invention is to provide a purchase card where the purchase card is activated for a predetermined period of time.

Another object is to provide a method for issuing a purchase card as a rebate award comprising: issuing a credit card to a card holder, said credit card being associated with a sponsor calculating a rebate amount based upon card holder purchases made with said credit card, issuing a purchase card to a card holder or to a recipient designated by said card holder, said purchase card having a purchase value determined by said rebate amount.

A further object of the invention is to provide a purchase card where the recipient of the purchase card activates the card.

A further object of the invention is to provide a purchase card where the recipient activates the purchase card by notifying the issuer that the recipient has received the purchase card.

A further object of the invention is to provide a purchase card where the purchase card is activated for a predetermined period of time.

A further object of the invention is to provide a purchase card where the rebate is calculated based on all purchases made with the credit card.

A further object of the invention is to provide a purchase card where the rebate is calculated based on purchase from the sponsor made with the credit card.

A further object of the invention is to provide a purchase card where the sponsor notifies the issuer of the amount of rebate due a credit card holder, and the issuer creates a purchase card in that amount.

A further object of the invention is to provide a purchase card where the rebate is based on the monetary value of the purchases.

Another object of the present invention is to provide a method for converting a purchase card into a credit card comprising: creating a purchase card account for a recipient designated by the purchaser; issuing the purchase card; receiving a request from the recipient to convert the purchase card into a credit card; determining whether the recipient meets predetermined credit criteria to convert the purchase card into a credit card; creating a credit card account; and converting the purchase card into a credit card.

A further object of the invention is to provide a purchase card where the balance of the purchase card account is transferred to the credit card account.

A further object of the invention is to provide a purchase card where the credit cards is immediately activated upon being converted from a purchase card.

Other objects and advantages exist for the present invention.

DETAILED DESCRIPTION OF THE PREFERRED EMBODIMENTS

Figure 1:
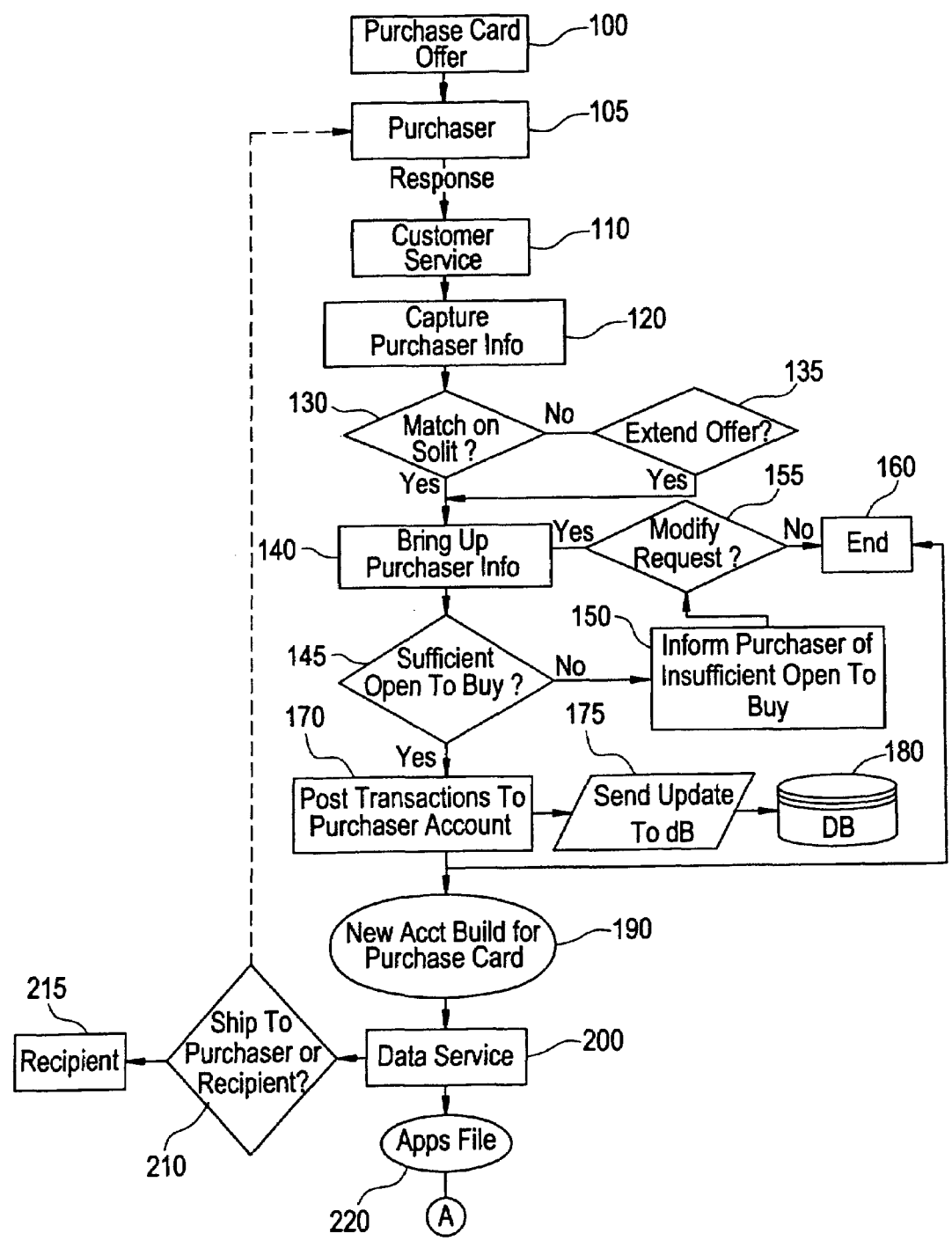
FIG. 1 shows a flow diagram for a portion of the purchase card system.

One embodiment of the purchase card system is shown in FIG. 1. In this embodiment the purchase card process begins with an offer to purchase a gift card at step 100. The offer may be in any suitable form that would notify prospective purchasers 105 of the availability of the purchase card. For example, a written solicitation may be mailed or otherwise distributed to potential purchasers 105. The offer may also be in the form of oral notification, for example, a telephone call to prospective purchasers 105. Alternatively, the offer may be published over a computer network, for example, on an Internet Web site. Other forms of offering the sale of a purchase card are also possible. In one embodiment of the invention, offers are made to prospective purchasers who already have a financial relationship with the offeror. Other potential purchasers may also be offered the opportunity to obtain a purchase card.

The offer may be accepted by a purchaser 105 by notifying a customer service center 110. The acceptance may be in any form acceptable to the customer service center 110. For example, the purchaser may mail, fax, or otherwise transmit a written acceptance, telephone an acceptance, or electronically transmit, for example, via Web Site, an acceptance by computer or other suitable device. At step 120, the customer service center 110 receives pertinent information to identify the purchaser 105 and the purchaser's desired spending limit for the purchase card. For example, the customer service center may identify the purchaser 105 by name, address, credit card account number, social security number, other unique identifiers or a combination of identifiers.

At step 130, the customer service center 120 is checked to verify that the caller or purchaser was included in the solicitations for this program. If the caller or purchaser was not originally solicited, customer service 120 determines whether to extend an offer in step 135.

If the caller or purchaser was solicited 130, certain purchaser 105 information may be accessed at 140. If, for example, the purchaser wishes to pay for the purchase card with a credit card, the purchaser's credit card account information may be accessed. For example, the purchaser's available credit limit may be accessed at 145 to verify that sufficient credit is available to cover the spending amount of the purchase card. If the available credit is insufficient, the purchaser 105 may be so informed at 150. The purchaser 105 may be given the opportunity to modify the purchase card spending amount, at 155, in order to ensure that the purchase amount does not exceed the available credit.

The process may terminate at 160 if, for example, the purchaser 105 does not wish to modify the purchase amount.

After it has been determined that the purchaser's available credit is sufficient, a transaction may be posted to the purchaser's credit card for the amount of the purchase at 170. In another embodiment of the present invention, a purchaser may use a check, cash, or other financial methods to obtain a purchase card. Regardless of the purchasing method, the issuer of the purchase card must determine whether the purchaser has sufficient funds to purchase the card.

When the purchase card is paid for by credit or bank account, the purchaser's account balance is updated at 175 to reflect the purchase. The account balance information, as well as information identifying the purchaser 105 and the recipient, may be stored in a retrievable and accessible fashion. For example, the information may be stored in computer database 180. After the purchaser 105 has paid (or authorized payment) for the purchase card, and it is posted to a credit card account, the acceptance process is complete and the acceptance process terminates at 160.

An account for the purchase card is created at 190. This may be performed by a third party processor that establishes and manages purchase card accounts for example, at 200. Creation of the purchase card account may comprise various actions, such as, recording the recipients 215 name, address and phone number, imprinting a card with an account number, a recipient name and an expiration date, encoding the card to record the purchase value stored thereon, and other actions, such as, for example, preparing account fulfillment documents (e.g. card carrier activation, etc.).

When the purchase card account is complete, the card is delivered. In one embodiment of the invention, card may be affiliated with a particular network, such a credit network, or debit network. For example, a card may be affiliated with the VISA® network. The delivery may be to the purchaser 105 or to the recipient 215, as shown at 210. The place of delivery may be arranged during the initial purchase of the card or other suitable time before delivery.

Information regarding an account is sent to account file 220, where an account can be monitored. In one embodiment, account file 220 allows monitoring of the current balance of an account, any activity in the account, including debits and credits, transaction updates, and the like. Other information about an account, such as purchase dispute resolutions, the history provided by the customer, and account status, may also be monitored.

Figure 2:
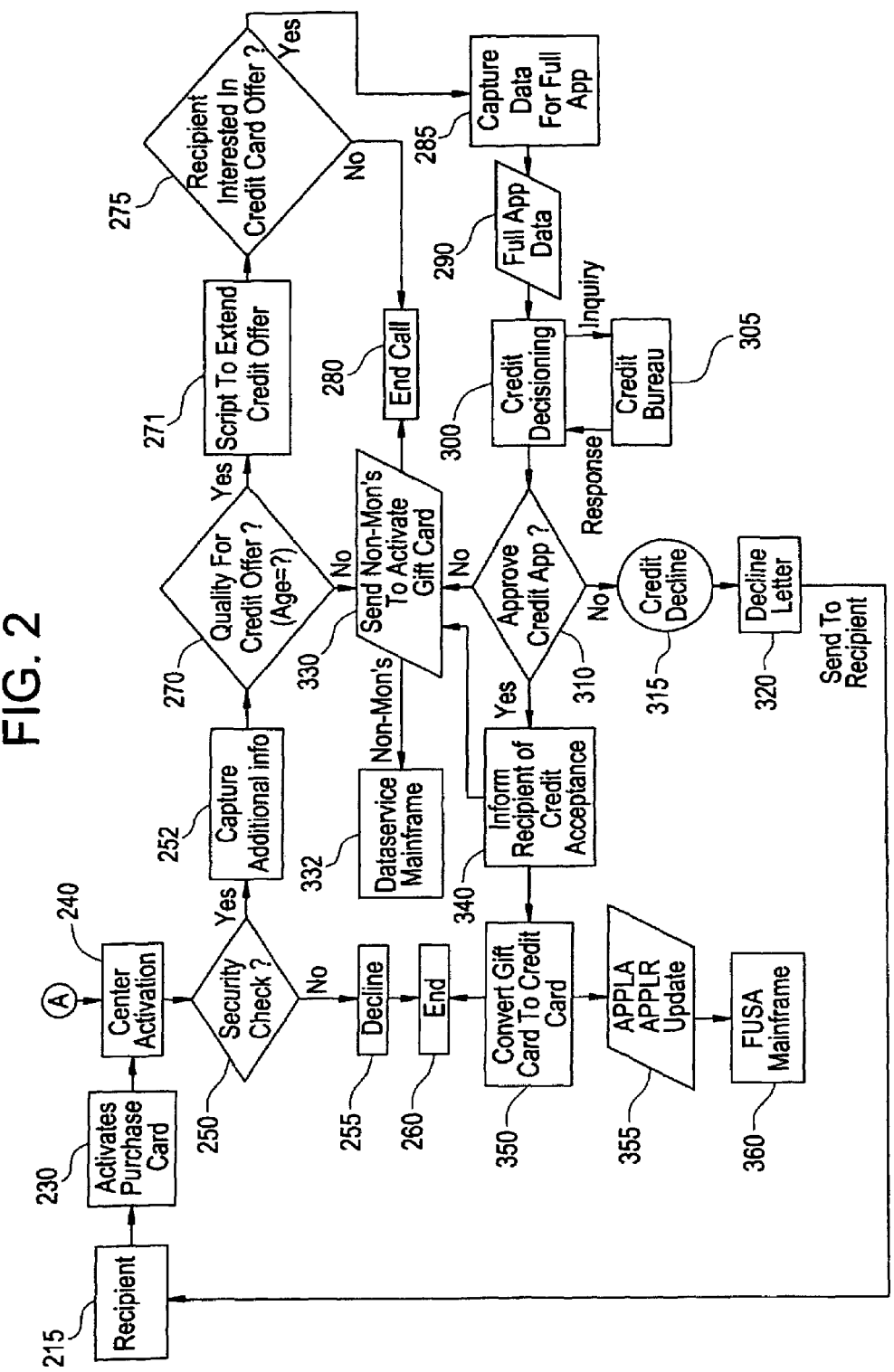
FIG. 2 shows a flow diagram for another portion of the purchase card system.

Before the purchase card can be used to make purchases, it must be activated as shown in FIG. 2 at 230. Activation may be accomplished in any suitable manner. For example, the recipient 215 of the card may place a telephone call to an activation center 240. Activation center 240 may act as a telemarketing vendor by verifying information about the recipient (i.e. name, address, telephone number, etc.) before the purchase card is activated. The activation center 240 may then transmit the data about the recipient to Data Service 200 to activate the purchase card for use. Activation center 240 may also modify information about a recipient, such as, for example, a change of address. Other forms of activation, such as by computer network may also be used.

During activation certain verifications may be made at 250 to ensure that the intended recipient 215 is the person attempting to activate the purchase card. These security checks 250 may entail questions about personal information (e.g., name, address, telephone number, etc.) or may utilize other well known methods of authenticating the recipient 215. If the person attempting to activate the purchase card does not pass the security check 250, the purchase card will be denied activation at 255 and the activation process may terminate at 260. If the person attempting to activate the purchase card passes the security check 250, they may be prompted at 252 for more information. The information may be used for subsequent security checks, should they be required, or to verify or complete the purchase card account information.

After activation the purchase card is ready for use. In some embodiments of the invention the activation process will end at this point. The recipient 215 may now use the purchase card to make purchases where ever, for example, VISA® cards are accepted. Each time a purchase is made using the card, the amount of the purchase will be debited from the card's available balance. The purchase card will continue to operate as long as a positive balance remains on the card. Some embodiments of the purchase card may have the capacity to have additional purchase value added to them after they have been activated.

If the recipient of a purchase card is someone other than the purchaser, the issuer of the card may notify the purchaser regarding various aspects of the card. For example, in one embodiment of the invention, the issuer could notify the purchaser that the purchase card has been received and activated by the intended recipient. An issuer may also notify a purchaser where the purchase card is being used, or what products are being purchased with the purchase card.

Some embodiments of the purchase card will include an expiration date. After the expiration date has passed the purchase card will be de-activated and cease to operate. In another embodiment of the present invention, a recipient or a purchaser of a purchase card may add to the balance of the purchase card account. This may take place in a manner substantially similar to the original purchasing of the purchase card. For example, a recipient of a purchase card may request that an amount be posted to the recipient's credit card and that the same amount then be credited to the recipient's purchase card account. Other methods of adding to the balance of a purchase card account may also be used.

Another embodiment of the invention allows the recipient 215 to convert the purchase card into a credit card. Conversion may be accomplished in the following manner. The recipient 215 calls the activation center 240 to activate the purchase card and the security check 250 may be performed in the usual manner. After passing the security check, the age of the recipient 215 is determined at 270. If the recipient 215 is an adult (e.g., over the age of 18) an offer to convert the purchase card into a credit card may be extended at 271. At step 275 the recipient 215 may decline the offer to convert, in which case the process may terminate at 280. If the recipient 215 elects to convert the purchase card to a credit card the activation center 240 may capture additional data 285 from recipient 215, in order to complete a credit card application. At step 290 the credit card application data is forwarded to a credit decisioning office 300. The credit decisioning office 300 may make inquiries to a credit bureau 305, for example, obtaining a credit report on the recipient 215. At 310 the decision is rendered whether to approve the credit card application. If the application for a credit card is declined at 315, the recipient 215 may be notified at 320. Notification may be in any suitable form, for example, a letter explaining the declined application may be mailed at 320 to the recipient 215. Other forms of notification may also be used to notify recipient 215 of the declined application.

Even though the credit card application is declined at 310, the purchase card is activated for use. At 330, the account settings allowing a card to be used at merchants are sent to the data service 200 and the card will be activated as a purchase card account. Information pertaining to the purchase card account is stored in a retrievable and accessible manner. For example, the purchase card account information may be stored in a computer 332.

If the decision at 310 is to accept the application for a credit card, the recipient 215 may be notified at 340. Again, notification may be in any suitable form, for example, a letter or other suitable notification. Regardless of the decision whether to convert the purchase card into a credit card, the purchase card is activated at the end of the activation call. If the purchase card is not already active, it may be activated at 345. At 350 the purchase card is converted to a credit card. The credit card will function in a manner usual for such credit instruments. For example, a credit limit may be assigned, periodic account activity statements may be generated and finance charges may be applied to any outstanding balance. In one embodiment, any remaining balance from the purchase card account may be transferred and applied to the credit card account. At 355 an update is sent to a retrievable data storage system, for example, computer 360. The update 355 sends credit card application decisions into a database.

In another embodiment of the purchase card, a financial institution (e.g., a bank) issues a credit card to a card holder. The card may be a co-branded card issued in cooperation with a sponsor. In this embodiment, the sponsor offers a rebate to the card holder based upon the dollar value amount of purchases made with the co-branded credit card. The rebate may apply to all purchases made or just to purchases made from the sponsor. The rebate may be calculated in a manner specified by the terms of the card holder agreement or other disclosures to the card holder. In one embodiment of the invention, disclosure about the rebate is provided to the card holder in a separate form included with the card holder agreement. For example, the sponsor may offer a flat percentage rebate for purchases made. In one embodiment of the invention, the card issuer calculates the rebate due the card holder based on the balance paid.

In another embodiment, the sponsor notifies the financial institution of the amount of rebate to be awarded to the card holder. The financial institution will then issue a purchase card for the amount of the rebate. The purchase card may be used for purchases in the above described manner, for example, everywhere VISA® is accepted, or the purchase card may be used for purchases solely with the sponsor or other designated entities.

Other embodiments and uses of the invention will be apparent to those skilled in the art from consideration of the specification and practice of the invention disclosed herein. The specification and examples should be considered exemplary only. The scope of the invention is only limited by the claims appended hereto.

What is claimed is:

1. A computer-implemented method for an issuer to create a stored value account as a rebate award, wherein the stored value account is affiliated with a predetermined transaction network and the issuer, the method comprising:
   determining a rebate amount based upon one or more purchases made by a purchaser, wherein the rebate amount comprises a monetary amount that may be used to make purchases; and
   creating in a computer database a stored value account, the stored value account having a purchase value based on said rebate amount, wherein the stored value account comprises information about:
   a) a stored value account number; and
   b) a stored value purchase amount, wherein the stored value purchase amount initially comprises the rebate amount;
   wherein the stored value account is usable for purchases from merchants or types of merchants designated by the issuer or a sponsor of the card and are affiliated with the transaction network;

issuing a stored value card associated with the stored value account; and activating the stored value account or card upon: (1) receipt of notification that the stored value card has been received by the purchaser or an intended recipient; or (2) establishing the name or verifying the identity of the purchaser or the intended recipient of the stored value card.

2. The method of claim 1, wherein the stored value card is marked with at least one of transaction network identification inimical associated with the transaction network and issuer identification inimical associated with the issuer.

3. The method of claim 2, wherein the stored value account further comprises information about:

a card holder's name, wherein the card holder comprises the purchaser or the intended recipient.

4. The method of claim 3, wherein the stored value card is further marked with the card holder's name before issuance.

5. The method of claim 3, wherein the notification is received from the card holder.

6. The method of claim 1, wherein activation of the stored value card or account comprises activating the stored value card or account for a predetermined period of time.

7. The method of claim 1, wherein the one or more purchases are made using cash or a first card instrument.

8. The method of claim 7, wherein the purchaser designates the intended recipient of the stored value card.

9. The method of claim 7, wherein the first card is associated with the sponsor.

10. The method of claim 9, wherein the merchants for which the stored value account or card is usable includes the sponsor.

11. The method of claim 7, wherein the first card is associated with a sponsor, and wherein the rebate amount is determined based on purchases from entities affiliated with the sponsor, wherein the purchases are made using cash or the first card.

12. The method of claim 7, wherein the recipient may add funds to the stored value account.

13. The method of claim 7, wherein the rebate amount is determined based on all purchases made with cash or the first card.

14. The method of claim 7, wherein the rebate amount is determined based only on purchases made with specific merchants.

15. The method of claim 1, wherein the act of establishing comprises receiving personal information from the purchaser or the intended recipient.

16. The method of claim 1, wherein the act of verifying comprises receiving personal information from the purchaser or the intended recipient.

17. The method of claim 1, wherein the intended recipient and the purchaser are the same person or entity.

18. The method of claim 1, wherein the purchase or intended recipient may add funds to the stored value account.

19. The method of claim 1, wherein the rebate amount is based on a monetary value associated with the one or more purchases.

20. The method of claim 1, wherein the rebate amount is based on the amount for the one or more purchases.

21. The method of claim 1, wherein the rebate amount is based on a flat percentage of the one or more purchases.

22. The method of claim 1, further comprising:
disclosing terms of the rebate amount determination to the purchaser, wherein the act of determining the rebate amount is in accordance with the disclosed terms.

23. The method of claim 1, wherein the predetermined transaction network and the issuer are the same.

24. The method of claim 1, further comprising:
receiving a request for a stored value card associated with the stored value account.

25. A computer-implemented method for an issuer to issue a stored value card as a rebate amount, wherein the stored value card is affiliated with a predetermined transaction network and the issuer, the method comprising:

determining a rebate amount based upon one or more purchases made by a purchaser using cash or a credit card associated with a sponsor, wherein the rebate amount comprises a monetary amount that may be used to make purchases;

creating in a computer database a stored value card account, the stored value card account having a purchase value based on said rebate amount, wherein the stored value card account comprises information about:
a) a card holder's name;
b) a stored value card account number; and
c) a stored value card purchase amount, wherein the stored value card purchase amount initially comprises the rebate amount;

receiving a request for a stored value card associated with the stored value account;

issuing the stored value card, wherein the stored value card is marked with at least one of transaction network identification inimical associated with the transaction network, issuer identification inimical associated with the issuer, and sponsor identification inimical associated with the sponsor, and wherein the stored value card is usable for purchases from any merchant that is part of a set of merchants designated by the issuer or the sponsor of the card; and activating the stored value account or card upon: (1) receipt of notification that the stored value card has been received by the purchaser or an intended recipient; (2) first use of the stored value account or card by the purchaser or intended recipient; or (3) establishing the name or verifying the identity of the purchaser or the intended recipient of the stored value card.

26. A computer-implemented method for an issuer to issue a stored value card as a rebate amount, wherein the stored value card is usable with a sponsor and entities affiliated with the sponsor, the method comprising:

determining a rebate amount based upon one or more purchases made by a purchaser using cash or a credit card associated with a sponsor, wherein the rebate amount comprises a monetary amount that may be used to make purchases;

creating in a computer database an stored value card account, the stored value card account having a purchase value based on said rebate amount, wherein the stored value card account comprises information about:
a) a stored value card account number; and
b) a stored value card purchase amount, wherein the stored value card purchase amount initially comprises the rebate amount;

issuing the stored value card, wherein the stored value card is marked with at least one of transaction network identification inimical associated with the transaction network, issuer identification inimical associated with the issuer, and sponsor identification inimical associated with the sponsor, and wherein the stored value card is usable for purchases from any merchant that is associated with the transaction network and which is part of a set of merchants designated by the issuer or a sponsor of the card; and activating the stored value account or card upon: (1) receipt of notification that the stored value card has been received by the purchaser or an intended recipient; (2) first use of the stored value account or card by the purchaser or intended recipient; or (3) establishing the name or verifying the identity of the purchaser or the intended recipient of the stored value card.

27. A computer-implemented method for an issuer to issue a stored value card as a rebate amount, wherein the stored value card is affiliated with a predetermined transaction network and the issuer, the method comprising:

determining a rebate amount based upon one or more purchases made using cash or a first card instrument of a purchaser, wherein the rebate amount comprises a monetary amount that may be used to make purchases;

creating in a computer database an stored value card account, the stored value card account having a purchase value based on said rebate amount, wherein the stored value card account comprises information about:
a) a card holder's name;
b) a stored value card account number; and
c) a stored value card purchase amount, wherein the stored value card purchase amount initially comprises the rebate amount; and issuing the stored value card, wherein the stored value card is marked with the card holder's name at the time of issuance and at least one of transaction network identification inimical associated with the transaction network and issuer identification inimical associated with the issuer, and wherein the stored value card is usable for purchases at merchants affiliated with the transaction network and which have been designated by the issuer or a sponsor of the stored value card; and activating the stored value account or card upon: (1) receipt of notification that the stored value card has been received by the purchaser or an intended recipient; (2) first use of the stored value account or card by the purchaser or intended recipient; or (3) establishing the name or verifying the identity of the purchaser or the intended recipient of the stored value card.

28. A computer-implemented system for an issuer to create a stored value account as a rebate award, wherein the stored value account is affiliated with a predetermined transaction network and the issuer, the system comprising:

a processor for determining a rebate amount based upon one or more purchases made by a purchaser. wherein the rebate amount comprises a monetary amount that may be used to make purchases;

a processor for creating in a computer database an stored value account, the stored value account having a purchase value based on said rebate amount, wherein the stored value card account comprises information about:
a) a stored value account number; and
b) a stored value purchase amount, wherein the stored value purchase amount initially comprises the rebate amount;

wherein the stored value account is usable for purchases from any merchant of a set of designated merchants affiliated with the transaction network; and a processor for activating the stored value account or card upon: (1) receipt of notification that the stored value card has been received by the purchaser or an intended recipient; (2) first use of the stored value account or card by the purchaser or intended recipient; or (3) establishing the name or verifying the identity of the purchaser or the intended recipient of the stored value card.

29. The system of claim 28, further comprising:
a processor for issuing the stored value card associated with the stored value account, wherein the stored value card is marked with at least one of transaction network identification inimical associated with the transaction network and issuer identification inimical associated with the issuer.

30. The system of claim 29, wherein the stored value account further comprises information about:
card holder's name, wherein the card holder comprises the purchaser or the intended recipient.

31. The system of claim 30, wherein the stored value card is further marked with the card holder's name before issuance.

32. The system of claim 30, further comprising:
a processor for receiving notification from the card holder or other entity that the stored value card has been received.

33. The system of claim 28, wherein the stored value card or account is activated for a predetermined period of time.

34. The system of claim 28, further comprising:
a processor for issuing a first card to the purchaser, wherein the one or more purchases are made using cash or a first card instrument.

35. The system of claim 34, wherein the purchaser designates the intended recipient of the stored value card.

36. The system of claim 34, wherein the first card is associated with a sponsor.

37. The system of claim 36, wherein the merchants for which the stored value account or card is usable includes the sponsor.

38. The system of claim 34. wherein the first card is associated with a sponsor, and wherein the rebate amount is determined based on purchases from entities affiliated with the sponsor, wherein the purchases are made using the first card.

39. The system of claim 34, wherein the purchaser or the intended recipient may add funds to the stored value card account.

40. The system of claim 34, wherein the rebate amount is determined based on all purchases made with cash or the first card.

41. The system of claim 34, wherein the rebate amount is determined based only on purchases made with specific merchants.

42. The system of claim 28, further comprising:
a processor for establishing a name of the card holder.

43. The system of claim 42, wherein the processor for activating the stored value account or card is configured to receive personal information from the purchaser or the intended recipient.

44. The system of claim 28, wherein identity verification is based on receiving personal information from the purchaser or the intended recipient.

45. The system of claim 28, wherein the intended recipient and the purchaser are the same person or entity.

46. The system of claim 28, wherein the intended recipient or purchaser may add funds to the stored value card account.

47. The system of claim 28, wherein the rebate amount is based on a monetary value associated with the one or more purchases.

48. The system of claim 28, wherein the rebate amount is based on the amount for the one or more purchases.

49. The system of claim 28, wherein the rebate amount is based on a flat percentage of the one or more purchases.

50. The system of claim 28, further comprising:
   a processor for disclosing terms of the rebate amount determination to the purchaser, wherein the act of determining the rebate amount is in accordance with the disclosed terms.

51. The system of claim 28, wherein the predetermined transaction network and the issuer are the same.

52. The system of claim 28, further comprising:
   a processor for receiving a request for a stored value card associated with the stored value account.

53. A computer-implemented system for an issuer to issue a stored value card as a rebate amount, wherein the stored value card is affiliated with a predetermined transaction network and the issuer, the system comprising:
   a processor for determining a rebate amount based upon one or more purchases made by a purchaser using cash or a credit card associated with a sponsor, wherein the rebate amount comprises a monetary amount that may be used to make purchases
   a processor for creating in a computer database an independent stored value card account, the stored value card account having a purchase value based on said rebate amount, wherein the independent stored value card account comprises information about:
      a) a card holder's name;
      b) a stored value card account number; and
      c) a stored value card purchase amount, wherein the stored value card purchase amount initially comprises the rebate amount;
   a processor for receiving a request for a stored value card associated with the stored value account; and
      a processor for issuing the stored value card, wherein the stored value card is marked with at least one of transaction network identification inimical associated with the transaction network, issuer identification inimical associated with the issuer, and sponsor identification inimical associated with the sponsor, and wherein the stored value card is usable for purchases only from merchants affiliated with the sponsor or which are part of a set of eligible merchants designated by the issuer or sponsor of the stored value card; and
      a processor for activating the stored value account or card upon: (1) receipt of notification that the stored value card has been received by the purchaser or an intended recipient; (2) first use of the stored value account or card by the purchaser or intended recipient; or (3) establishing the name or verifying the identity of the purchaser or the intended recipient of the stored value card.

54. A computer-implemented system for an issuer to issue a stored value card as a rebate amount, wherein the stored value card is usable with a sponsor, the system comprising:
   a processor for determining a rebate amount based upon one or more purchases made by a purchaser using cash or a credit card associated with a sponsor. wherein the rebate amount comprises a monetary amount that may be used to make purchases;
   a processor for creating in a computer database an stored value card account, the stored value card having a purchase value based on said rebate amount, wherein the stored value card account comprises information about:
      a) a stored value card account number; and
      b) a stored value card purchase amount, wherein the stored value card purchase amount initially comprises the rebate amount;
   a processor for issuing the stored value card, wherein the stored value card is marked with at least one of transaction network identification inimical associated with the transaction network, issuer identification inimical associated with the issuer, and sponsor identification inimical associated with the sponsor, and wherein the stored value card is usable for purchases only from merchants affiliated with the sponsor or the transaction network; and
   a processor for activating the stored value account or card upon: (1) receipt of notification that the stored value card has been received by the purchaser or an intended recipient; (2) first use of the stored value account or card by the purchaser or intended recipient; or (3) establishing the name or verifying the identity of the purchaser or the intended recipient of the stored value card.

55. A computer-implemented system for an issuer to issue a stored value card as a rebate amount, wherein the stored value card is affiliated with a predetermined transaction network and the issuer, the system comprising:
   a processor for determining a rebate amount based upon one or more purchases made using cash or a first card instrument of a purchaser, wherein the rebate amount comprises a monetary amount that may be used to make purchases;
   a processor for creating in a computer database an stored value card account, the stored value card having a purchase value based on said rebate amount, wherein the stored value card account comprises information about:
      a) a card holder's name;
      b) a stored value card account number; and
      c) a stored value card purchase amount, wherein the stored value card purchase amount initially comprises the rebate amount;
   a processor for issuing the stored value card, wherein the stored value card is marked with the card holder's name before issuance and at least one of transaction network identification inimical associated with the transaction network and issuer identification inimical associated with the issuer, and wherein the stored value card is usable for purchases from any merchant or type of merchant that is designated by the issuer or sponsor and that is affiliated with the transaction network.
   a processor for activating the stored value account or card upon: (1) receipt of notification that the stored value card has been received by the purchaser or an intended recipient: (2) first use of the stored value account or card by the purchaser or intended recipient; or (3) establishing the name or verifying the identity of the purchaser or the intended recipient of the stored value card.

56. A computer-implemented system for an issuer to create a stored value account as a rebate amount, wherein the stored value account is affiliated with a predetermined transaction network and the issuer, the system comprising:
   a rebate-calculating processor for determining a rebate amount based upon one or more purchases made by a purchaser. wherein the rebate amount comprises a monetary amount that may be used to make purchases;

a computer storage system for storing an account file containing information about an stored value account, the stored value account having a purchase value based on said rebate amount, wherein the stored value card account comprises information about:

a) a stored value account number; and b) a stored value purchase amount, wherein the stored value purchase amount initially comprises the rebate amount;

wherein the stored value account is usable for purchases from merchants or types of merchants that are designated by the issuer or a sponsor; and a processor for activating the stored value account or a stored value card associated therewith upon: (1) receipt of notification that the stored value card has been received by the purchaser or an intended recipient; (2) first use of the stored value account or card by the purchaser or intended recipient; or (3) establishing the name or verifying the identity of the purchaser or the intended recipient of the stored value card.

57. The system of claim 56, wherein the stored value card associated with the stored value account is issued to a card holder, further comprising:

a marking device configured to mark the stored value card with at least one of transaction network identification inimical associated with the transaction network and issuer identification inimical associated with the issuer;

wherein the card holder comprises the purchaser or the intended recipient.

58. The system of claim 57, wherein the stored value account further comprises information about:

a card holder's name.

59. The system of claim 58, wherein the marking device is further configured to mark the stored value card with the card holder's name prior to the time of issuance.

60. The system of claim 58, further comprising:

an input device for receiving notification from the card holder that the stored value card has been received.

61. The system of claim 56, wherein the rebate-calculating processor is configured to determine the rebate amount based on purchases from entities affiliated with the sponsor, wherein the purchases are made using cash or a first card.

62. The system of claim 56, wherein the rebate-calculating processor is configured to determine the rebate amount based on all purchases made with cash or a first card.

63. The system of claim 56, wherein the rebate-calculating processor is configured to determine the rebate amount based only on purchases made with specific merchants.

64. The system of claim 56, wherein the merchants for which the stored value card is usable include the sponsor.

65. The system of claim 56, wherein the rebate-calculating entity is configured to determine the rebate amount based on a monetary value associated with the one or more purchases.

66. The system of claim 56, wherein the rebate-calculating entity is further configured to determine the rebate amount based on the total amount of the one or more purchases.

67. The system of claim 56, wherein the rebate-calculating entity is configured to determine the rebate amount based on a flat percentage of the one or more purchases.

68. The system of claim 56, further comprising:

an output device for passing information about terms of the rebate amount determination to the purchaser, wherein the rebate amount is determined in accordance with the terms.

69. The system of claim 56, wherein the predetermined transaction network and the issuer are the same.

70. The system of claim 56, further comprising:

an input device for receiving a request for a stored value card associated with the stored value account.

71. A computer-implemented method for an issuer to create a stored value account as a rebate award, wherein the stored value account is affiliated with a predetermined transaction network and the issuer, the method comprising:

determining a rebate amount based upon one or more purchases made by a purchaser using cash or a credit card, wherein the rebate amount comprises a monetary amount that may be used to make purchases;

creating in a computer database an stored value account, the stored value account having a purchase value based on said rebate amount, wherein the stored value card account comprises information about:

a) a stored value account number; and b) a stored value purchase amount, wherein the purchase amount initially comprises the rebate amount;

c) a cardholder's name;

issuing a stored value card associated with the stored value account to a recipient designated by the purchaser, wherein the stored value card is marked with at least one of transaction network identification indicia associated with the transaction network and issuer identification indicia associated with the issuer, wherein the stored value account is usable for purchases from merchants or types of merchants that have been designated by the issuer or a sponsor or merchant;

receiving notification that the stored value card has been received; and activating the stored value card based on the notification, the first use of the stored value account or card by the purchaser or intended recipient: or upon establishing the name or verifying the identity of the purchaser or the intended recipient of the stored value card.

72. A computer-implemented method for an issuer to create a stored value account as a reward, wherein the stored value account is affiliated with a predetermined transaction network and the issuer, the method comprising:

receiving a reward amount based upon one or more purchases made by a purchaser, wherein the reward amount comprises a monetary amount that may be used to make purchases; and creating in a computer database an stored value account, the stored value account having a purchase value based on said reward amount, wherein the stored value account comprises information about:

a) a stored value account number; and b) a stored value purchase amount, wherein the stored value purchase amount initially comprises the reward amount, wherein the stored value account is usable for purchases; and activating the stored value account upon: (1) receipt of notification that a stored value card associated with the stored value account has been received by the purchaser or an intended recipient; (2) establishing the name or verifying the identity of the purchaser or the intended recipient of the stored value card.

73. The method of claim 72 wherein the reward amount is received from a merchant or a sponsor of the stored value card.

74. The method of claim 72 wherein the reward amount comprises a rebate.

75. A computer-implemented method for an issuer to create a stored value account as a reward, wherein the stored value account is affiliated with a predetermined transaction network and the issuer, the method comprising:
creating in a computer database a stored value account, the stored value account having a purchase value based on a reward amount, wherein the reward amount is a monetary amount and is based upon one or more purchases made by a purchaser, and wherein the stored value account comprises information about:
a) a stored value account number; and
b) a stored value purchase amount, wherein the stored value purchase amount initially comprises the reward amount, and
activating the stored value account upon: (1) receipt of notification that a stored value card associated with the stored value account has been received by the purchaser or an intended recipient; (2) first use of the stored value account or card by the purchaser or intended recipient; or (3) establishing the name or verifying the identity of the purchaser or the intended recipient of the stored value card;
wherein the stored value account is usable for purchases from merchants or types of merchants designated by the issuer or a sponsor or merchant.

76. A computer-implemented method for an issuer to create a stored value card as a reward, wherein the stored value card is affiliated with a predetermined transaction network and the issuer, the method comprising:
receiving a reward amount based upon one or more purchases made by a purchaser, wherein the reward amount comprises a monetary amount that may be used to make purchases; and
creating in a computer database a stored value account associated with the stored value card, the stored value account having a purchase value based on said reward amount, wherein the stored value account comprises information about:
a) a stored value account number; and
b) a stored value purchase amount, wherein the stored value purchase amount initially comprises the reward amount, and
wherein the stored value card is usable for purchases from any merchant or type of merchant designated by the issuer or a sponsor or merchant; and
activating the stored value account or card upon: (1) receipt of notification that the stored value card has been received by the purchaser or an intended recipient; (2) first use of the stored value account or card by the purchaser or intended recipient; or (3) establishing the name or verifying the identity of the purchaser or the intended recipient of the stored value card.

77. The method of claim 76 wherein before issuance, the stored value card is marked with the purchaser or the intended recipient's name.

78. A computer-implemented method for an issuer to create a stored value account as a rebate award, wherein the stored value account is affiliated with a predetermined transaction network and the issuer, the method comprising:
determining or receiving from a sponsor or merchant a rebate amount based upon one or more purchases made by a purchaser, wherein the rebate amount comprises a monetary amount that may be used to make purchases; and
creating in a computer database a stored value account, the stored value account having a purchase value based on said rebate amount, wherein the stored value account comprises information about:
a) a stored value account number; and
b) a stored value purchase amount, wherein the stored value purchase amount initially comprises the rebate amount;
wherein the stored value account is usable for purchases at multiple merchants designated by the issuer or the sponsor or merchant and are affiliated with the transaction network;
issuing a stored value card associated with the stored value account; and
activating the stored value account or card upon: (1) receipt of notification that the stored value card has been received by the purchaser or an intended recipient; or (2) establishing the name or verifying the identity of the purchaser or the intended recipient of the stored value card.

79. A computer-implemented method for an issuer to create a stored value account as a rebate award, wherein the stored value account is affiliated with a predetermined transaction network and the issuer, the method comprising:
determining or receiving from a sponsor or merchant a rebate amount based upon one or more purchases made by a purchaser, wherein the rebate amount comprises a monetary amount that may be used to make purchases; and
creating in a computer database a stored value account, the stored value account having a purchase value based on said rebate amount, wherein the stored value account comprises information about:
a) a stored value account number; and
b) a stored value purchase amount, wherein the stored value purchase amount initially comprises the rebate amount;
wherein the stored value account is usable for purchases at multiple merchants or types of merchants designated by the issuer or the sponsor or merchant and are affiliated with the transaction network;
issuing a stored value card associated with the stored value account; and
activating the stored value account or card upon: (1) receipt of notification that the stored value card has been received by the purchaser or an intended recipient; or (2) establishing the name or verifying the identity of the purchaser or the intended recipient of the stored value card.

80. A computer-implemented method for an issuer to create a stored value account as a rebate award, wherein the stored value account is affiliated with a predetermined transaction network and the issuer, the method comprising:
determining or receiving from a sponsor or merchant a rebate amount based upon one or more purchases made by a purchaser, wherein the rebate amount comprises a monetary amount that may be used to make purchases; and
creating in a computer database a stored value account, the stored value account having a purchase value based on said rebate amount, wherein the stored value account comprises information about:

a) a stored value account number; and
b) a stored value purchase amount, wherein the stored value purchase amount initially comprises the rebate amount;
wherein the stored value account is usable for purchases from merchants designated by the purchaser of the card and are affiliated with the transaction network;
issuing a stored value card associated with the stored value account; and
activating the stored value account or card upon: (1) receipt of notification that the stored value card has been received by the purchaser or an intended recipient; or (2) establishing the name or verifying the identity of the purchaser or the intended recipient of the stored value card.

81. A computer-implemented method for an issuer to create a stored value account as a rebate award, wherein the stored value account is affiliated with the issuer, the method comprising:
determining or receiving from a sponsor or merchant a rebate amount based upon one or more purchases made by a purchaser, wherein the rebate amount comprises a monetary amount that may be used to make purchases; and
creating in a computer database a stored value account, the stored value account having a purchase value based on said rebate amount, wherein the stored value account comprises information about:
a) a stored value account number; and
b) a stored value purchase amount, wherein the stored value purchase amount initially comprises the rebate amount;
selecting or receiving from the sponsor or merchant or purchaser designated entities affiliated with a particular network, wherein the stored value account may be used for purchases at the designated entities;
issuing a stored value card associated with the stored value account; and
activating the stored value account or card upon: (1) receipt of notification that the stored value card has been received by the purchaser or an intended recipient; or (2) establishing the name or verifying the identity of the purchaser or the intended recipient of the stored value card.

82. The method of claim 81 wherein the particular network is a credit network.

83. The method of claim 81 wherein the particular network is a debit network.

84. A computer-implemented method for an issuer to create a stored value account as a rebate award, wherein the stored value account is affiliated with the issuer, the method comprising:
determining or receiving from a sponsor or merchant a rebate amount based upon one or more purchases made by a purchaser, wherein the rebate amount comprises a monetary amount that may be used to make purchases; and
creating in a computer database a stored value account, the stored value account having a purchase value based on said rebate amount, wherein the stored value account comprises information about:
a) a stored value account number; and
b) a stored value purchase amount, wherein the stored value purchase amount initially comprises the rebate amount;
selecting or receiving from the sponsor or merchant or purchaser designated merchants that operate on a particular network, wherein the stored value account may be used for purchases at the designated merchants;
issuing a stored value card associated with the stored value account; and
activating the stored value account or card upon: (1) receipt of notification that the stored value card has been received by the purchaser or an intended recipient; or (2) establishing the name or verifying the identity of the purchaser or the intended recipient of the stored value card.

85. The method of claim 84 wherein the particular network is a credit network.

86. The method of claim 84 wherein the particular network is a debit network.

87. A computer-implemented method for an issuer to create a stored value account as a rebate award, wherein the stored value account is affiliated with a predetermined transaction network and the issuer, the method comprising:
determining or receiving from a sponsor or merchant a rebate amount based upon one or more purchases made by a purchaser, wherein the rebate amount comprises a monetary amount that may be used to make purchases; and
creating in a computer database a stored value account, the stored value account having a purchase value based on said rebate amount, wherein the stored value account comprises information about:
a) a stored value account number; and
b) a stored value purchase amount, wherein the stored value purchase amount initially comprises the rebate amount;
wherein the stored value account is usable for purchases from all merchants that are affiliated with the transaction network, except those merchants or types of merchants that are designated by the issuer, the sponsor or merchant or the purchaser;
issuing a stored value card associated with the stored value account; and
activating the stored value account or card upon: (1) receipt of notification that the stored value card has been received by the purchaser or an intended recipient; or (2) establishing the name or verifying the identity of the purchaser or the intended recipient of the stored value card.

88. A computer-implemented method for an issuer to create a stored value account as a rebate award, wherein the stored value account is affiliated with a predetermined transaction network and the issuer, the method comprising:
determining or receiving from a sponsor or merchant a rebate amount based upon one or more purchases made by a purchaser, wherein the rebate amount comprises a monetary amount that may be used to make purchases; and
creating in a computer database a stored value account, the stored value account having a purchase value based on said rebate amount, wherein the stored value account comprises information about:
a) a stored value account number; and
b) a stored value purchase amount, wherein the stored value purchase amount initially comprises the rebate amount;
wherein the stored value account is usable for purchases from all entities or types of entities that are affiliated with the transaction network, except those entities or types of entities that are designated by the issuer, the sponsor or merchant or the purchaser;

issuing a stored value card associated with the stored value account; and activating the stored value account or card upon: (1) receipt of notification that the stored value card has been received by the purchaser or an intended recipient; or (2) establishing the name or verifying the identity of the purchaser or the intended recipient of the stored value card.

89. A computer-implemented method for an issuer to create a stored value account as a rebate award, wherein the stored value account is affiliated with a predetermined transaction network and the issuer, the method comprising:

determining or receiving from a sponsor or merchant a rebate amount based upon one or more purchases made by a purchaser, wherein the rebate amount comprises a monetary amount that may be used to make purchases; and creating in a computer database a stored value account, the stored value account having a purchase value based on said rebate amount, wherein the stored value account comprises information about:

a) a stored value account number; and b) a stored value purchase amount, wherein the stored value purchase amount initially comprises the rebate amount;

wherein the stored value account is usable to purchase goods or services or types of goods or services from all merchants or types of merchants that are affiliated with the transaction network, except those goods or services or types of goods or services or those merchants or types of merchants that are excluded by the issuer, the sponsor or merchant or the purchaser;

issuing a stored value card associated with the stored value account; and activating the stored value account or card upon: (1) receipt of notification that the stored value card has been received by the purchaser or an intended recipient; or (2) establishing the name or verifying the identity of the purchaser or the intended recipient of the stored value card.

90. A computer-implemented method for an issuer to create a stored value account as a rebate award, wherein the stored value account is affiliated with a predetermined transaction network and the issuer, the method comprising:

determining or receiving from a sponsor or merchant a rebate amount based upon one or more purchases made by a purchaser, wherein the rebate amount comprises a monetary amount that may be used to make purchases; and creating in a computer database a stored value account, the stored value account having a purchase value based on said rebate amount, wherein the stored value account comprises information about:

a) a stored value account number; and b) a stored value purchase amount, wherein the stored value purchase amount initially comprises the rebate amount;

wherein the stored value account is usable to purchase goods or services or types of goods or services from all entities or types of entities that are affiliated with the transaction network, except those goods or services or types of goods or services or entities or types of entities that are excluded by the issuer, the sponsor or merchant or purchaser;

issuing a stored value card associated with the stored value account; and activating the stored value account or card upon: (1) receipt of notification that the stored value card has been received by the purchaser or an intended recipient; or (2) establishing the name or verifying the identity of the purchaser or the intended recipient of the stored value card.

91. A computer-implemented method for an issuer to create a stored value account as a rebate award, wherein the stored value account is affiliated with a predetermined transaction network and the issuer, the method comprising:

determining a rebate amount based upon one or more purchases made by a purchaser, wherein the rebate amount comprises a monetary amount that may be used to make purchases; and creating in a computer database a stored value account, the stored value account having a purchase value based on said rebate amount, wherein the stored value account comprises information about:

a) a stored value account number; and b) a stored value purchase amount, wherein the stored value purchase amount initially comprises the rebate amount;

wherein the stored value account is usable for purchases from merchants or types of merchants designated by the issuer or a sponsor or merchant and are affiliated with the transaction network;

issuing a stored value card associated with the stored value account; and activating the stored value account or card upon: (1) receipt of notification that the stored value card has been received by the purchaser or an intended recipient; or (2) establishing the name or verifying the identity of the purchaser or the intended recipient of the stored value card.

92. A computer-implemented method for an issuer to create a stored value account as a rebate award, wherein the stored value account is affiliated with a predetermined transaction network and the issuer, the method comprising:

determining or receiving from a sponsor or merchant a rebate amount based upon one or more purchases made by a purchaser, wherein the rebate amount comprises a monetary amount that may be used to make purchases; and creating in a computer database a stored value account, the stored value account having a purchase value based on said rebate amount, wherein the stored value account comprises information about:

a) a stored value account number; and b) a stored value purchase amount, wherein the stored value purchase amount initially comprises the rebate amount;

wherein the stored value account is usable for purchases at multiple merchants designated by the issuer or the sponsor or merchant of the card and are affiliated with the transaction network;

issuing a stored value card associated with the stored value account; and activating the stored value account or card upon: (1) receipt of notification that the stored value card has been received by the purchaser or an intended recipient; (2) first use of the stored value account or card by the purchaser or intended recipient; or (3) establishing the name or verifying the identity of the purchaser or the intended recipient of the stored value card.

93. A computer-implemented method for an issuer to create a stored value account as a rebate award, wherein the stored value account is affiliated with a predetermined transaction network and the issuer, the method comprising:

determining or receiving from a sponsor or merchant a rebate amount based upon one or more purchases made by a purchaser, wherein the rebate amount comprises a monetary amount that may be used to make purchases; and creating in a computer database a stored value account, the stored value account having a purchase value based on said rebate amount, wherein the stored value account comprises information about:

a) a stored value account number; and b) a stored value purchase amount, wherein the stored value purchase amount initially comprises the rebate amount;

wherein the stored value account is usable for purchases at multiple merchants or types of merchants designated by the issuer or the sponsor or merchant and are affiliated with the transaction network;

issuing a stored value card associated with the stored value account; and activating the stored value account or card upon: (1) receipt of notification that the stored value card has been received by the purchaser or an intended recipient; (2) first use of the stored value account or card by the purchaser or intended recipient; or (3) establishing the name or verifying the identity of the purchaser or the intended recipient of the stored value card.

94. A computer-implemented method for an issuer to create a stored value account as a rebate award, wherein the stored value account is affiliated with a predetermined transaction network and the issuer, the method comprising:

determining or receiving from a sponsor or merchant a rebate amount based upon one or more purchases made by a purchaser, wherein the rebate amount comprises a monetary amount that may be used to make purchases; and creating in a computer database a stored value account, the stored value account having a purchase value based on said rebate amount, wherein the stored value account comprises information about:

a) a stored value account number; and b) a stored value purchase amount, wherein the stored value purchase amount initially comprises the rebate amount;

wherein the stored value account is usable for purchases from merchants designated by the purchaser of the card and are affiliated with the transaction network;

issuing a stored value card associated with the stored value account; and activating the stored value account or card upon: (1) receipt of notification that the stored value card has been received by the purchaser or an intended recipient; (2) first use of the stored value account or card by the purchaser or intended recipient; or (3) establishing the name or verifying the identity of the purchaser or the intended recipient of the stored value card.

95. A computer-implemented method for an issuer to create a stored value account as a rebate award, wherein the stored value account is affiliated with the issuer, the method comprising:

determining or receiving from a sponsor or merchant a rebate amount based upon one or more purchases made by a purchaser, wherein the rebate amount comprises a monetary amount that may be used to make purchases; and creating in a computer database a stored value account, the stored value account having a purchase value based on said rebate amount, wherein the stored value account comprises information about:

a) a stored value account number; and b) a stored value purchase amount, wherein the stored value purchase amount initially comprises the rebate amount;

selecting or receiving from the sponsor or merchant or the purchaser designated entities affiliated with a particular network, wherein the stored value account may be used for purchases at the designated entities;

issuing a stored value card associated with the stored value account; and activating the stored value account or card upon: (1) receipt of notification that the stored value card has been received by the purchaser or an intended recipient; (2) first use of the stored value account or card by the purchaser or intended recipient; or (3) establishing the name or verifying the identity of the purchaser or the intended recipient of the stored value card.

96. The method of claim 95 wherein the particular network is a credit network.

97. The method of claim 95 wherein the particular network is a debit network.

98. A computer-implemented method for an issuer to create a stored value account as a rebate award, wherein the stored value account is affiliated with the issuer, the method comprising:

determining or receiving from a sponsor or merchant a rebate amount based upon one or more purchases made by a purchaser, wherein the rebate amount comprises a monetary amount that may be used to make purchases; and creating in a computer database a stored value account, the stored value account having a purchase value based on said rebate amount, wherein the stored value account comprises information about:

a) a stored value account number; and b) a stored value purchase amount, wherein the stored value purchase amount initially comprises the rebate amount;

selecting or receiving from the sponsor or merchant or the purchaser designated merchants that operate on a particular network, wherein the stored value account may be used for purchases at the designated merchants;

issuing a stored value card associated with the stored value account; and activating the stored value account or card upon: (1) receipt of notification that the stored value card has been received by the purchaser or an intended recipient; (2) first use of the stored value account or card by the purchaser or intended recipient; or (3) establishing the name or verifying the identity of the purchaser or the intended recipient of the stored value card.

99. The method of claim 98 wherein the particular network is a credit network.

100. The method of claim 98 wherein the particular network is a debit network.

101. A computer-implemented method for an issuer to create a stored value account as a rebate award, wherein the stored value account is affiliated with a predetermined transaction network and the issuer, the method comprising:

determining or receiving from a sponsor or merchant a rebate amount based upon one or more purchases made by a purchaser, wherein the rebate amount comprises a monetary amount that may be used to make purchases; and creating in a computer database a stored value account, the stored value account having a purchase value based on said rebate amount, wherein the stored value account comprises information about:

a) a stored value account number; and b) a stored value purchase amount, wherein the stored value purchase amount initially comprises the rebate amount;

wherein the stored value account is usable for purchases from all merchants that are affiliated with the transaction network, except those merchants or types of merchants that are excluded by the issuer, the sponsor or merchant or the purchaser;

issuing a stored value card associated with the stored value account; and activating the stored value account or card upon: (1) receipt of notification that the stored value card has been received by the purchaser or an intended recipient; (2) first use of the stored value account or card by the purchaser or intended recipient; or (3) establishing the name or verifying the identity of the purchaser or the intended recipient of the stored value card.

102. A computer-implemented method for an issuer to create a stored value account as a rebate award, wherein the stored value account is affiliated with a predetermined transaction network and the issuer, the method comprising:

determining or receiving from a sponsor or merchant a rebate amount based upon one or more purchases made by a purchaser, wherein the rebate amount comprises a monetary amount that may be used to make purchases; and creating in a computer database a stored value account, the stored value account having a purchase value based on said rebate amount, wherein the stored value account comprises information about:

a) a stored value account number; and b) a stored value purchase amount, wherein the stored value purchase amount initially comprises the rebate amount;

wherein the stored value account is usable for purchases from all entities or types of entities that are affiliated with the transaction network, except those entities or types of entities that are excluded by the issuer, the sponsor or merchant or the purchaser;

issuing a stored value card associated with the stored value account; and activating the stored value account or card upon: (1) receipt of notification that the stored value card has been received by the purchaser or an intended recipient; (2) first use of the stored value account or card by the purchaser or intended recipient; or (3) establishing the name or verifying the identity of the purchaser or the intended recipient of the stored value card.

103. A computer-implemented method for an issuer to create a stored value account as a rebate award, wherein the stored value account is affiliated with a predetermined transaction network and the issuer, the method comprising:

determining or receiving from a sponsor or merchant a rebate amount based upon one or more purchases made by a purchaser, wherein the rebate amount comprises a monetary amount that may be used to make purchases; and creating in a computer database a stored value account, the stored value account having a purchase value based on said rebate amount, wherein the stored value account comprises information about:

a) a stored value account number; and b) a stored value purchase amount, wherein the stored value purchase amount initially comprises the rebate amount;

wherein the stored value account is usable to purchase goods or services or types of goods or services from all merchants or types of merchants that are affiliated with the transaction network, except those goods or services or types of goods or services or those merchants or types of merchants that are excluded by the issuer, the sponsor or merchant or the purchaser;

issuing a stored value card associated with the stored value account; and activating the stored value account or card upon: (1) receipt of notification that the stored value card has been received by the purchaser or an intended recipient; (2) first use of the stored value account or card by the purchaser or intended recipient; or (3) establishing the name or verifying the identity of the purchaser or the intended recipient of the stored value card.

104. A computer-implemented method for an issuer to create a stored value account as a rebate award, wherein the stored value account is affiliated with a predetermined transaction network and the issuer, the method comprising:

determining or receiving from a sponsor or merchant a rebate amount based upon one or more purchases made by a purchaser, wherein the rebate amount comprises a monetary amount that may be used to make purchases; and creating in a computer database a stored value account, the stored value account having a purchase value based on said rebate amount, wherein the stored value account comprises information about:

a) a stored value account number; and b) a stored value purchase amount, wherein the stored value purchase amount initially comprises the rebate amount;

wherein the stored value account is usable to purchase goods or services or types of goods or services from all entities or types of entities that are affiliated with the transaction network, except those goods or services or types of goods or services or entities or types of entities that are excluded by the issuer, the sponsor or merchant or the purchaser;

issuing a stored value card associated with the stored value account; and activating the stored value account or card upon: (1) receipt of notification that the stored value card has been received by the purchaser or an intended recipient; (2) first use of the stored value account or card by the purchaser or intended recipient; or (3) establishing the name or verifying the identity of the purchaser or the intended recipient of the stored value card.

105. A computer-implemented method for an issuer to create a stored value account as a rebate award, wherein the stored value account is affiliated with a predetermined transaction network and the issuer, the method comprising:

determining or receiving from a sponsor or merchant a rebate amount based upon one or more purchases made by a purchaser, wherein the rebate amount comprises a monetary amount that may be used to make purchases; and creating in a computer database a stored value account, the stored value account having a purchase value based on said rebate amount, wherein the stored value account comprises information about:

a) a stored value account number; and b) a stored value purchase amount, wherein the stored value purchase amount initially comprises the rebate amount;

wherein the stored value account is usable for purchases from merchants or types of merchants designated by the issuer or the sponsor or merchant and are affiliated with the transaction network;

issuing a stored value card associated with the stored value account; and activating the stored value account or card upon: (1) receipt of notification that the stored value card has been received by the purchaser or an intended recipient; (2) first use of the stored value account or card by the purchaser or intended recipient; or (3) establishing the name or verifying the identity of the purchaser or the intended recipient of the stored value card.

106. The method of claim 1 wherein, after issuance, the stored value account or card is reloaded with funds or an additional rebate amount by the issuer, the sponsor or merchant, the purchaser or intended user.

107. The method of claim 1 wherein, after issuance, the stored value account or card is reloaded with funds or an additional rebate amount by the issuer, sponsor, purchaser or intended user.

108. The method of claim 78 wherein, after issuance, the stored value account or card is reloaded with funds or an additional rebate amount by the issuer, the sponsor or merchant, the purchaser or intended user.

109. The method of claim 87 wherein, after issuance, the stored value account or card is reloaded with funds or an additional rebate amount by the issuer, the sponsor or merchant, the purchaser or intended user.

110. The method of claim 88 wherein, after issuance, the stored value account or card is reloaded with funds or an additional rebate amount by the issuer, the sponsor or merchant, the purchaser or intended user.

111. The method of claim 89 wherein, after issuance, the stored value account or card is reloaded with funds or an additional rebate amount by the issuer, the sponsor or merchant, the purchaser or intended user.

112. The method of claim 90 wherein, after issuance, the stored value account or card is reloaded with funds or an additional rebate amount by the issuer, the sponsor or merchant, purchaser or intended user.

113. A computer-implemented method for an issuer to create a stored value account as a reward, wherein the stored value account is affiliated with a predetermined transaction network and the issuer, the method comprising:

receiving a reward amount based upon one or more purchases made by a purchaser, wherein the reward amount comprises a monetary amount that may be used to make purchases; and creating in a computer database an stored value account, the stored value account having a purchase value based on said reward amount, wherein the stored value account comprises information about:

a) a stored value account number; and b) a stored value purchase amount, wherein the stored value purchase amount initially comprises the reward amount, wherein the stored value account is usable for purchases; and activating the stored value account upon: (1) receipt of notification that a stored value card associated with the stored value account has been received by the purchaser or an intended recipient; (2) first use of the stored value account or card by the purchaser or intended recipient; or (3) establishing the name or verifying the identity of the purchaser or the intended recipient of the stored value card.

114. The method of claim 113 wherein the reward amount is received from a merchant or a sponsor of the stored value card.

115. The method of claim 113 wherein the reward amount comprises a rebate.

* * * * *